(12) United States Patent
Burton

(10) Patent No.: US 11,478,695 B2
(45) Date of Patent: *Oct. 25, 2022

(54) PORTAL DEVICE AND COOPERATING VIDEO GAME MACHINE

(71) Applicant: Warner Bros. Entertainment Inc., Burbank, CA (US)

(72) Inventor: Jon Burton, Malibu, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/813,725

(22) Filed: Mar. 9, 2020

(65) Prior Publication Data

US 2020/0384348 A1 Dec. 10, 2020

Related U.S. Application Data

(63) Continuation of application No. 15/727,531, filed on Oct. 6, 2017, now Pat. No. 10,583,352, which is a
(Continued)

(51) Int. Cl.
*A63F 13/00* (2014.01)
*A63F 9/24* (2006.01)
(Continued)

(52) U.S. Cl.
CPC .............. *A63F 9/24* (2013.01); *A63F 13/213* (2014.09); *A63F 13/214* (2014.09); *A63F 13/65* (2014.09);
(Continued)

(58) Field of Classification Search
CPC ..... A63H 2200/00; A63F 9/24; A63F 13/213; A63F 13/214; A63F 13/65; A63F 13/822; A63F 2009/2442; A63F 2009/246
See application file for complete search history.

(56) References Cited

U.S. PATENT DOCUMENTS

| 4,391,447 A | 7/1983 | Dudley |
| 5,462,281 A | 10/1995 | Gaito et al. |

(Continued)

FOREIGN PATENT DOCUMENTS

| JP | 2004337502 A | * 12/2004 | |
| JP | 2004337504 A | * 12/2004 | ........... A63F 13/214 |

OTHER PUBLICATIONS

WO, PCT/US2016/026988 ISR and Written Opinion, dated Jul. 19, 2016.

*Primary Examiner* — Milap Shah
(74) *Attorney, Agent, or Firm* — One LLP

(57) ABSTRACT

A portal device for a video game includes a pad with different zones that can be illuminated by selectable colors, a toy sensor (e.g., an RFID tag sensor) associated with each zone, a controller and a communications port for communicating with a video game process executing on a game machine. The colors of each zone can be configured to one or a combination of three primary colors during game play, based on the game process. The portal device reacts to placement of tagged toys on zones and the color of the zones during play and provides sensor data to the game process. The game process controls the game state in part based on data from the portal device and in part on other user input.

23 Claims, 19 Drawing Sheets

Related U.S. Application Data continuation of application No. PCT/US2016/026988, filed on Apr. 11, 2016.

(60) Provisional application No. 62/145,505, filed on Apr. 9, 2015.

(51) Int. Cl.
*A63F 13/213* (2014.01)
*A63F 13/214* (2014.01)
*A63F 13/65* (2014.01)
*G07F 17/32* (2006.01)
*A63F 13/822* (2014.01)

(52) U.S. Cl.
CPC ........ *A63F 13/822* (2014.09); *G07F 17/3209* (2013.01); *G07F 17/3218* (2013.01); *G07F 17/3225* (2013.01); *G07F 17/3232* (2013.01); *G07F 17/3237* (2013.01); *A63F 2009/246* (2013.01); *A63F 2009/2442* (2013.01)

(56) References Cited

U.S. PATENT DOCUMENTS

| | | | |
|---|---|---|---|
| 5,853,327 A | 12/1998 | Gilboa | |
| 6,568,683 B1 | 5/2003 | Harpaz | |
| 6,773,325 B1* | 8/2004 | Mawle | A63F 13/02 446/175 |
| 7,474,983 B2 | 1/2009 | Mazalek et al. | |
| 7,843,471 B2* | 11/2010 | Doan | G06F 3/0393 345/633 |
| 8,287,372 B2 | 10/2012 | Hong et al. | |
| 9,333,427 B2 | 5/2016 | Sabo et al. | |
| 2006/0178204 A1 | 8/2006 | Okada | |
| 2007/0015588 A1 | 1/2007 | Matsumoto et al. | |
| 2008/0014833 A1 | 1/2008 | Bozzone et al. | |
| 2009/0158210 A1* | 6/2009 | Cheng | G06Q 30/0224 715/810 |
| 2010/0164865 A1* | 7/2010 | Hirano | G06Q 10/00 345/156 |
| 2010/0201069 A1 | 8/2010 | Lam | |
| 2010/0331083 A1 | 12/2010 | Maharbiz et al. | |
| 2011/0021109 A1* | 1/2011 | Le | A63H 13/00 446/300 |
| 2012/0295703 A1 | 11/2012 | Reiche et al. | |
| 2012/0295704 A1* | 11/2012 | Reiche | A63F 13/77 463/31 |
| 2013/0123009 A1 | 5/2013 | Maharbiz et al. | |
| 2013/0165223 A1* | 6/2013 | Leyland | A63F 13/213 463/30 |
| 2013/0196766 A1 | 8/2013 | Leyland et al. | |
| 2013/0296058 A1 | 11/2013 | Leyland et al. | |
| 2014/0121008 A1 | 5/2014 | Canessa | |
| 2014/0162785 A1* | 6/2014 | Reiche | A63F 13/12 463/35 |
| 2014/0179446 A1 | 6/2014 | Zuniga et al. | |
| 2014/0274373 A1 | 9/2014 | Olshan et al. | |
| 2014/0335958 A1* | 11/2014 | Weisman | A63F 13/00 463/37 |
| 2015/0174479 A1 | 6/2015 | Reiche et al. | |
| 2016/0236085 A1 | 8/2016 | Yano | |
| 2018/0028904 A1* | 2/2018 | Burton | G07F 17/3218 |

* cited by examiner

1410
SENDING AN ACTIVATION SIGNAL TO A PORTAL DEVICE THAT IS COMMUNICATIVELY COUPLED TO THE GAME COMPUTER, WHEREIN THE ACTIVATION SIGNAL IS CONFIGURED FOR REQUESTING ACTIVATION OF MULTIPLE TOY SENSORS EACH ASSOCIATED WITH A DIFFERENT ONE OF DISTINCT TOY PLACEMENT ZONES OF THE PORTAL DEVICE

1420
RECEIVING A PORTAL OUTPUT SIGNAL FROM THE PORTAL DEVICE, WHEREIN THE PORTAL DEVICE DETERMINES THE PORTAL OUTPUT SIGNAL BASED ON AT LEAST ONE TOY IDENTIFIER FOR A CORRESPONDING AT LEAST ONE TOY AND AN ASSOCIATED ONE OR MORE OF THE DISTINCT TOY PLACEMENT ZONES THAT THE AT LEAST ONE TOY IDENTIFIED BY THE AT LEAST ONE TOY IDENTIFIER IS PLACED IN

1430
DETERMINING, BY THE AT LEAST ONE PROCESSOR, A CHANGE IN GAME STATE OF THE VIDEO GAME PROCESS, BASED ON THE PORTAL OUTPUT SIGNAL

1440
CHANGING THE GAME STATE

DETERMINING CHANGE IN GS INFO

1510
SHIFTING AN AVATAR TO A DIFFERENT ONE OF MULTIPLE RIFTS BASED ON A COLOR ASSIGNED TO THE ASSOCIATED ONE OR MORE OF THE DISTINCT TOY PLACEMENT ZONES

1520
SETTING A KEY COLOR FOR UNLOCKING A COLOR-PATTERN LOCK BASED ON COLORS ASSIGNED TO ONE OR MORE CHARACTERS IN THE VIDEO GAME PROCESS WHEREIN EACH OF THE ONE OR MORE CHARACTERS IS MAPPED TO A DIFFERENT ONE OF THE AT LEAST ONE TOY IDENTIFIER, AND FURTHER BASED ON THE ASSOCIATED ONE OR MORE OF THE DISTINCT TOY PLACEMENT ZONES THAT THE AT LEAST ONE TOY IDENTIFIED BY THE AT LEAST ONE TOY IDENTIFIER IS PLACED IN

1530
SETTING THE KEY COLOR COMPRISES SELECTING A COLOR BASED ON A MIX OF DIFFERENT PRIMARY COLORS ASSIGNED TO DIFFERENT ONES OF AT LEAST TWO OF THE ONE OR MORE CHARACTERS

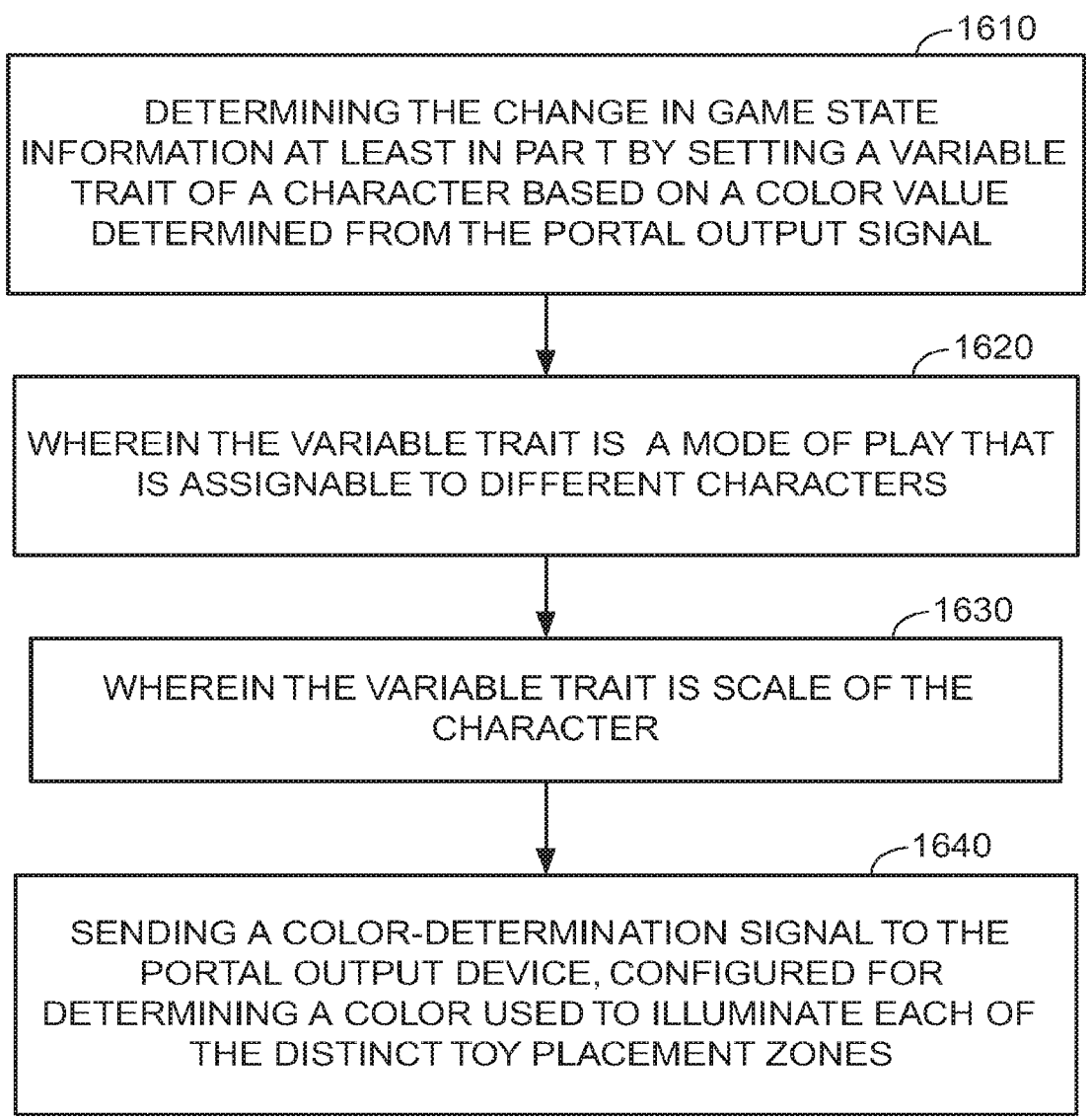

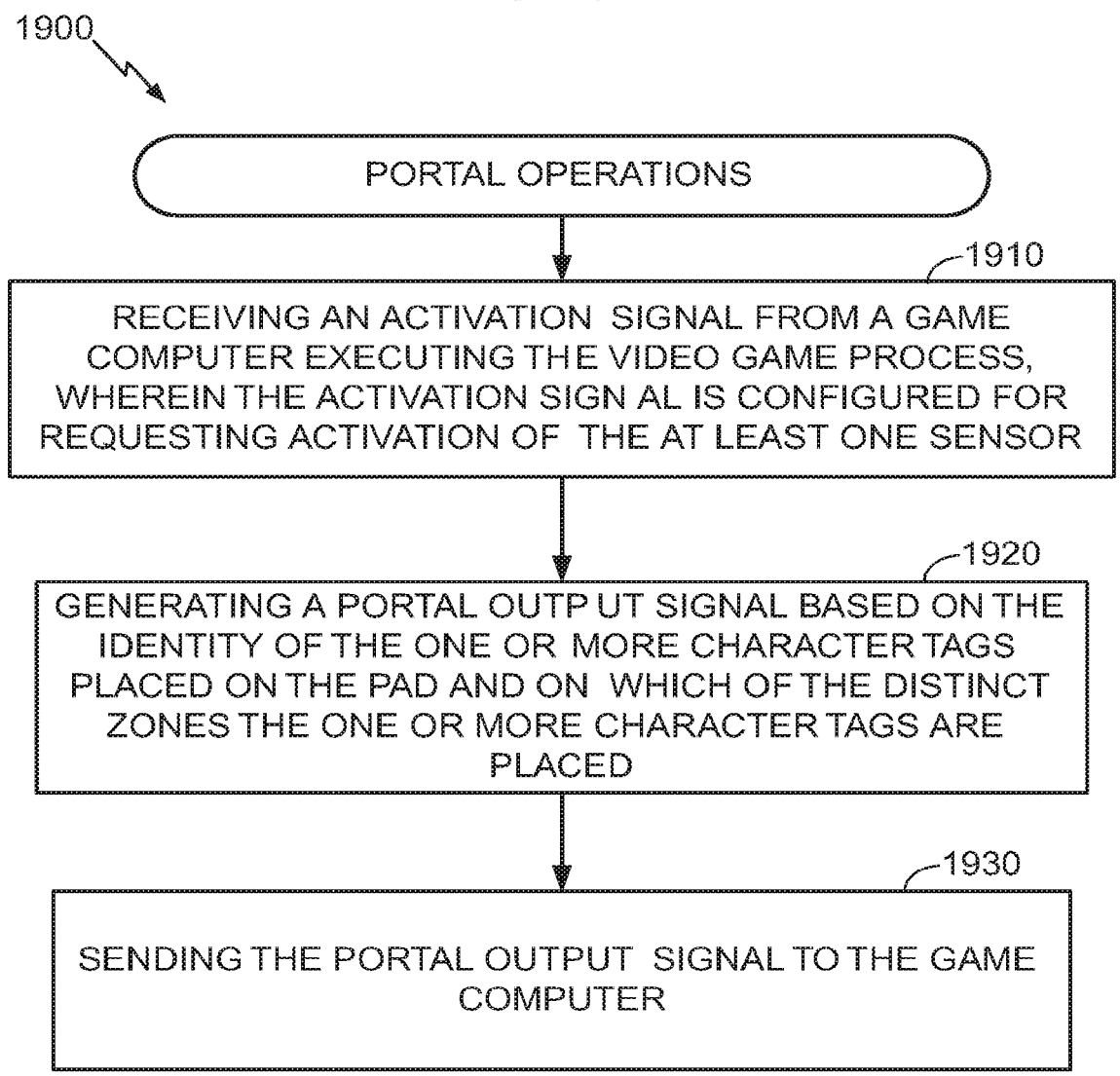

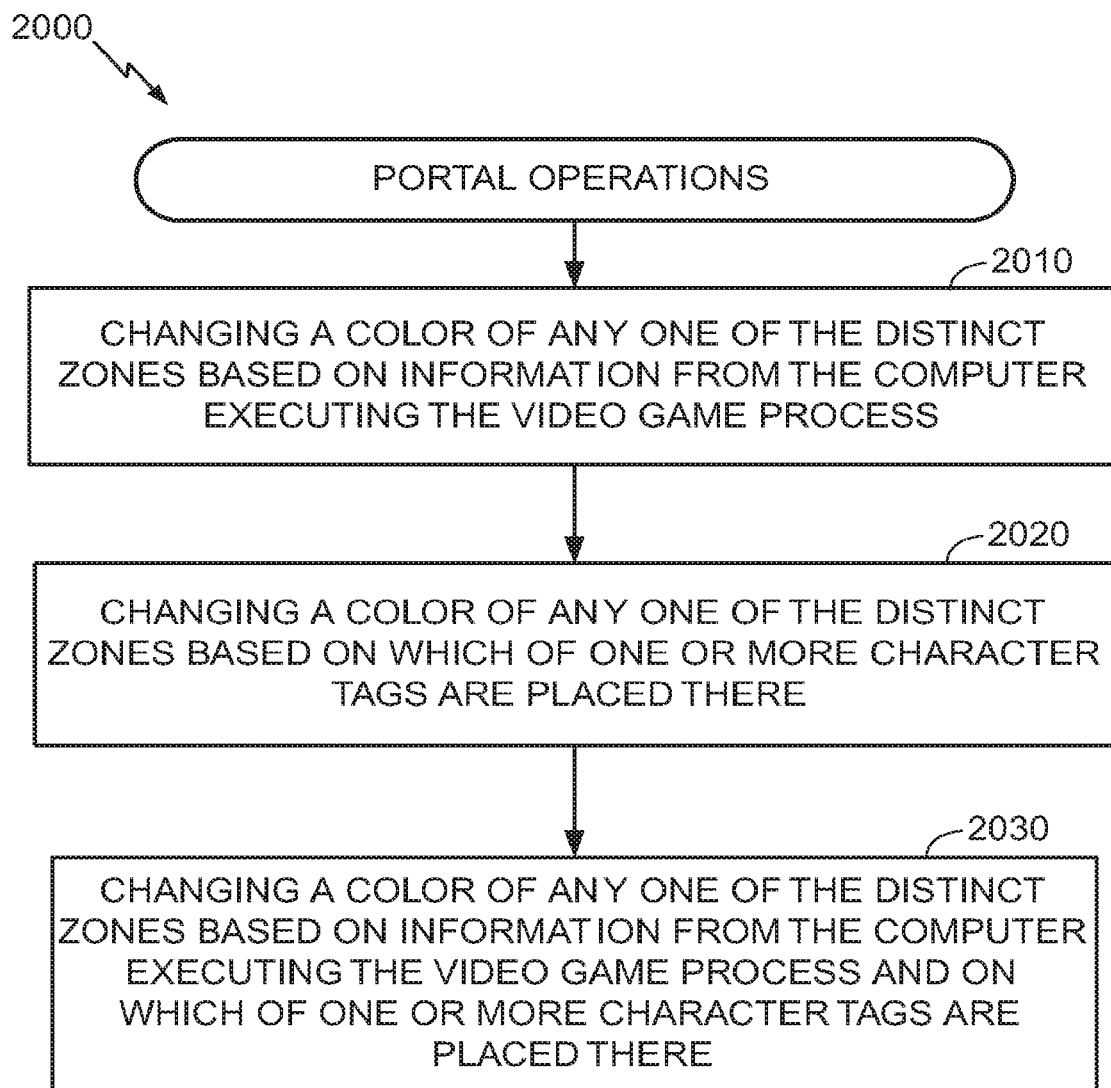

PORTAL DEVICE AND COOPERATING VIDEO GAME MACHINE

CROSS-REFERENCE TO RELATED APPLICATIONS

This application is a continuation of U.S. patent application Ser. No. 15/727,531, filed Oct. 6, 2017, which is a continuation of International Patent Application No. PCT/US2016/026988, filed Apr. 11, 2016, which claims priority pursuant to 35 U.S.C. § 119(e) to U.S. Provisional Patent Application No. 62/145,505 filed Apr. 9, 2015, the disclosures of all of which are hereby incorporated by reference, in their entireties.

FIELD

The present disclosure relates to methods and apparatus for providing, by a computer coupled to a sensor ("portal") device, a video game that reacts to positioning of a toy relative to the portal device.

BACKGROUND

Video games often provide for operation of an avatar controlled in response to user input that interacts with a modeled two-dimensional (2D) or three-dimensional (3D) modeled environment and one or more 2D or 3D characters controlled by the computer using automatic algorithms and/or input from other players. As used herein, "character" generally includes both avatars and characters controlled by the computer using automatic algorithms without direct user input, while "automatically controlled character" or similar terms are used where it is desired to make clear that avatars are being excluded. A user may control more than one avatar in a scene by shifting the input focus from one character to the next; the character with the focus becomes the current avatar and the remaining characters in the scene are controlled automatically.

Each character may be modeled to appear, for example, as a person, animal, alien, fantasy creature, living toy or robot and is represented in computer memory by a set fixed data objects, for example, a 3D mesh, a set of textures for coloring and rendering the mesh, an armature organized as a hierarchical set nodes comprising "joints" that define relationships between "bones," and a rule set for mapping the armature to the mesh. Each character may be animated between key frames of video output based on an associated variable data set of control parameters, for example, a set of current positions and orientations for nodes of the armature, a texture set selection variable, camera settings for rendering the scene, and lighting parameters for rendering the scene. User input is used to control characters chiefly by changing the armature data in response to user input, causing the avatar to move and articulate its limbs and head, while interacting with the modeled environment and other characters according to a set of rules, e.g., "physics" rules that resemble physical laws but usually permit actions that are not possible in reality. In addition, character data may include a set of 2D sprites that may be used to approximate 3D rendering of the character and speed up the responsiveness of the character to user input in the output video.

Characters move and interact with machines and static modeled environments that are similarly modeled in computer memory using fixed data objects and variable parameters. Environmental objects may be static in position or move only in response to character activity according to a set of rules. If modeled as a machine, environmental objects may move according to a limited set of pre-programmed actions. While there is no strict distinction between a computer-controlled character and a modeled machine, computer-controlled character actions resemble avatar actions, while machine actions are simpler and often predictable or repetitive.

A data set comprising all of the variable parameters for characters and environmental objects in a scene together with variable rendering parameters (e.g., camera and lighting parameters) may be referred to as a "game state." The game state may change with each calculation cycle of the game process executed by the game machine, based on user inputs and process rules. A software executable for instantiating a game process may sometimes be called a "game engine," while a game machine may sometimes be referred to as a "game computer," "computer," or similar terminology. Cycles for determination of a game state may vary based on computational load and game machine capabilities. For modern video games, game cycle frequency is usually less than 1 Herz (cycles per second), for example about 10 Herz or higher, for further example, between about 10 and $10^6$ Herz. Note that modern processor frequencies are in the gigahertz ($10^9$) range, and a process cycle period is determined by the time between a change of any game state variable. A video key frame may be generated after every cycle, or less frequently. If the video key frame cycle frequency is lower than the output video frequency, a graphics engine may interpolate intervening frames between key frames. It should be appreciated that 2D games may operate similarly to 3D games, but with less complex processing and rendering rules.

A "portal device," as used herein, is an input device that is configured for sensing a toy, or a physical token representing a toy, in proximity to itself and providing a video game process with information regarding the sensed toy or token. Portal devices have been used to control the appearance or activation of a character in a video game. When a portal device senses placement or removal of a toy, it sends a signal to the game process to which the portal is coupled via a wired or wireless coupling. The game process may respond by enabling access to a previously "locked" or hidden character, for example. Thus, a user who possesses a certain toy may obtain the privilege of interacting with a video game character that resembles the toy, while users that do not possess the toy are deprived of the privilege.

However, the utility of prior portal devices have been too limited to raise lasting interest in the toy or associated video game. Once the novelty of unlocking the associated character wears off, the portal device adds little or nothing of ongoing interest to the end user of the video game.

It would be desirable, therefore, to provide a new, more interactive apparatus for a portal device and methods of using it in conjunction with a video game, that overcome these and other limitations of the prior art and enhance the appeal, enjoyment, and capacity for providing education or healthful mental exercise afforded by video games and related toys.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application.

Differences between the sections may include supplemental disclosures of alternative embodiments, additional details, or alternative descriptions of identical embodiments using different terminology, as should be apparent from the respective disclosures.

In an aspect of the disclosure, a portal device or apparatus for interacting with a computer executing a video game process includes a processor, a memory coupled to the processor, and a port for coupling the portal device to a computer executing a video game process. The portal device may further include a base supporting the processor, memory and port in an assembly. The portal device may further include a pad coupled to the base. The pad may be configured for placement and removal of character tags or toys and may be is divided into distinct zones. Divisions between zones may be visible or invisible.

The portal device may further include an array of light-emitting devices fixed in relation to the pad and configured to independently illuminate each of the distinct zones with any one of multiple colors in response to a varying control signal from the processor. For example, the light-emitting devices may be, or may include, triplets of red, green and blue light-emitting diodes. Divisions between the distinct zones may be indicated by causing each of the triplets to emit a different color.

The portal device may further include at least one sensor coupled to the processor and configured for sensing an identity of one or more character tags placed on the pad and for sensing which of the distinct zones the one or more character tags are placed. For example, the at least one sensor may be, or may include, an array of radio-frequency identification device (RFID) receivers tuned to a frequency of RFID tags to which toys are or can be attached, or that are incorporated into respective toys. Each RFID sensor in the array may be mounted in, under, on or near a different one of the distinct zones.

In an aspect of the portal device, its memory holds instructions that when executed by the processor cause the portal device to perform certain operations. These operations may include, for example, receiving an activation signal from a game computer executing the video game process, wherein the activation signal is configured for requesting activation of the at least one sensor. The operations may further include generating a portal output signal based on the identity of the one or more character tags placed on the pad and on which of the distinct zones the one or more character tags are placed, and sending the portal output signal to the game computer.

In related aspects, the memory may hold further instructions for changing a color of any one of the distinct zones based on information from the computer executing the video game process, or based on which of one or more character tags are placed there, or both.

In another aspect, the pad in which the zones are provided may be generally flat. The portal device may include an attachment plate adjacent to the pad, configured for attachment of toy interlocking plastic bricks. The portal device may be provided in a kit with toy bricks and other components from which the user may assembly a toy that can be attached to the portal device, enhancing its appearance.

In another aspect of the disclosure, a computer-implemented method for a video game process in conjunction with a portal device may include sending, by at least one processor of a game computer executing a video game process that manipulates an avatar relative to a game space in response to user input, an activation signal to a portal device that is communicatively coupled to the game computer, wherein the activation signal is configured for requesting activation of multiple toy sensors each associated with a different one of distinct toy placement zones of the portal device. The method may further include receiving, by the at least one processor, a portal output signal from the portal device, wherein the portal device determines the portal output signal based on at least one toy identifier for a corresponding at least one toy and an associated one or more of the distinct toy placement zones that the at least one toy identified by the at least one toy identifier is placed in. The method may further include determining, by the at least one processor, a change in game state of the video game process, based on the portal output signal, and changing the game state accordingly.

In an aspect, determining the change in game state information may include shifting an avatar to a different one of multiple rifts based on a color assigned to the associated one or more of the distinct toy placement zones. In an alternative, the determining the change in game state information may include setting a key color for unlocking a color-pattern lock based on colors assigned to one or more characters in the video game process wherein each of the one or more characters is mapped to a different one of the at least one toy identifier, and further based on the associated one or more of the distinct toy placement zones that the at least one toy identified by the at least one toy identifier is placed in. Setting the key color may include selecting, by the processor, a color based on a mix of different primary colors assigned to different ones of at least two of the one or more characters.

In another aspect, determining the change in game state information may include setting a variable trait of a character based on a color value determined from the portal output signal. The variable trait may be, for example, a mode of play that is assignable to different characters. For further example, the variable trait may be a scale or size of the character.

In another aspect, the method may include sending a color-determination signal to the portal output device, configured for determining a color used to illuminate each of the distinct toy placement zones. The signal may be explicit or implicit. In an alternative, the portal device may determine the color, and provide an indication of the color for each zone to the processor, explicitly or implicitly.

Any of the foregoing methods may be implemented in any suitable programmable computing apparatus, by provided program instructions in a non-transitory computer-readable medium that, when executed by a computer processor, cause the apparatus to perform the described operations. An apparatus may include a computer configured with a video game executable. Other elements of the apparatus may include, for example, a display screen, an audio output device, and a user input device, which participate in the execution of the method. A display device may include a virtual reality or augmented reality device, such as a headset or other display that reacts to movements of a user's head or body to provide the impression of being placed inside of the rendered scene in which the video game is played.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 14 is a flow chart illustrating a method by a game machine cooperating with a portal device for using portal device input in a video game process.

FIGS. 15-16 are flow charts illustrating further optional aspects or operations of the method diagrammed in FIG. 14.

FIGS. 19-20 are flow charts illustrating optional processes performed by the components of an apparatus or system as diagrammed in FIGS. 18A-18B.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
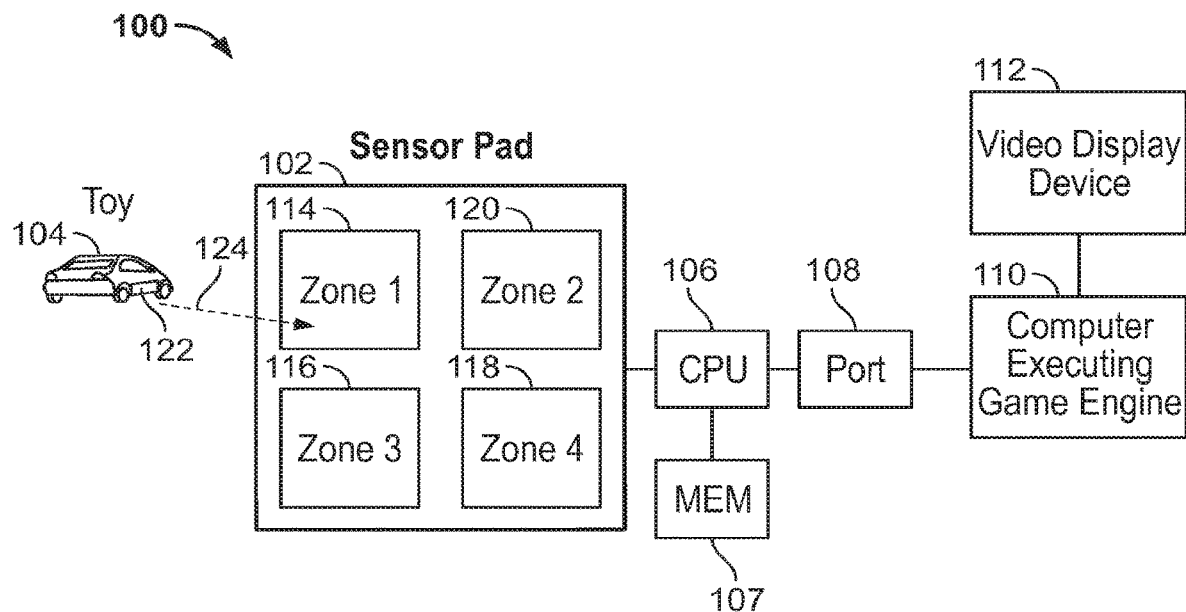
FIG. 1 is a schematic block diagram illustrating aspects of a system and apparatus for using a portal device in connection with a video game.

FIG. 1 schematically illustrates a portal device 100, comprising a sensor pad 102 coupled via a CPU 106 or other microprocessor and communications port 108. The portal device 100 may be coupled to a computer 110 (e.g., a game console, PC, laptop, notepad, or mobile device) executing a game engine via a wired or wireless connection. The computer 110 provides video output to a video display device 112. The portal device 112 detects positioning of the toy 104, via a character tag 122 coupled to the toy 104. The character tag 122 may be a RFID device that transmits a wireless signal detected by the sensor pad 102. In the alternative, or in addition, the sensor pad 102 may detect 124 the character tag 122 using an optical sensor. The character tag 122 is correlated to a character in game play, for example using a relational data structure. For example, a "Batman" toy correlates to a Batman game character visible on the video display device 112 during game play.

The sensor pad 102 may be divided into various zones. Four zones 114, 116, 118, 120 are depicted, but any plural number of zones may be used. Activation of the zones may be indicated by visible signaling, for example by illuminating respective zones with colored lights or the like. The CPU 106 may control activation of the zone, and/or vary the effect of placing or removing a toy from a zone, in a time-varying manner that is correlated to game play on the computer. Executable instructions for the CPU 106 may be help in a memory 107. A combination of zones of the portal may be referred to herein as a light pad or pad. The portal device 100 may also be referred to as a "base unit."

The portal device 100 and computer 110 may communicate information for determining a varying function of each zone 114, 116, 118, 120 in response to detection of placement of a character tag 122 on a zone, removal of a character tag from a zone, or presence/absence of a character tag on a zone. A zone that is activated may be correlated to an active region of the video game, which may be referred to herein as a hotspot. For example, a playing area or level within the video game may be referred to as a "rift." In an embodiment, a rift resembles a sort of suspended or floating platform in the video game render. A character may be prevented from moving from rift to rift without special input. By moving a character tag to an activated light pad or zone, the user may cause a video game character to move from rift to rift. Moving from rift to rift may be an essential aspect of game play.

Figure 2:
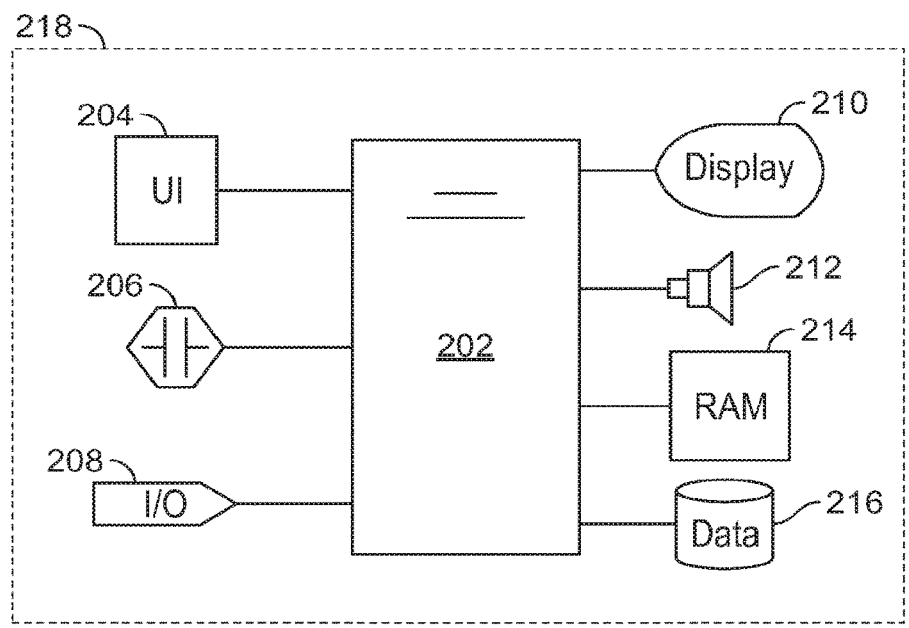
FIG. 2 is a schematic block diagram illustrating more detailed aspects of a game machine coupled to a portal device.

Referring to FIG. 2, aspects of a game computer 200 for operating a game process in cooperation with a portal device are illustrated. The apparatus 200 may include, for example, a processor 202, for example a central processing unit based on 80×86 architecture as designed by Intel™ or AMD™, a system-on-a-chip as designed by ARM™, or any other suitable microprocessor. The processor 202 may be communicatively coupled to auxiliary devices or modules of the game computer 200, using a bus or other coupling. Optionally, the processor 202 and some or all of its coupled auxiliary devices or modules (examples of which are depicted at 204-216) may be housed within or coupled to a housing 218, for example, a housing having a form factor of a personal computer, gaming console, smart phone, notepad computer, laptop computer, set-top box, wearable googles, glasses, or visors, or other form factor.

A user interface device 204 may be coupled to the processor 202 for providing user control input to a content display process operated by a graphics display engine executing on the processor 202. User control input may include, for example, selections from a graphical user interface or other input (e.g., textual or directional commands) generated via a touch screen, keyboard, pointing device (e.g., game controller), microphone, motion sensor, camera, or some combination of these or other input devices. Control input may also be provided via a sensor 206 that is part of a portal device (as described elsewhere herein) coupled to the processor 202. A sensor may comprise, for example, a position sensor, and RFID receiver, optical sensor, or other sensor. The sensor 206 may detect placement of an identified character tag on a zone of the portal device.

The device 200 may optionally include an input/output port 208 coupled to the processor 202, to enable communication between a game engine and a computer network. Such communication may be used, for example, to enable multiplayer game experiences, or social networking features.

A display 220 may be coupled to the processor 202, for example via a graphics processing unit (not shown) integrated in the processor 202 or in a separate chip. The display 210 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 210 may be incorporated into a virtual reality headset or other immersive display system. Similarly, an amplifier/speaker or other audio output transducer 222 may be coupled to the processor 202 via an audio processing system. Audio output correlated to the video output and generated by the VR/AR display engine or other application may be provided to the audio transducer 222 and output as audible sound to the user.

The 3D environment apparatus 200 may further include a random access memory (RAM) 214 holding program instructions and data for rapid execution or processing by the processor during game play, including frequent updating of a game state for a 3D game environment. When the device 200 is powered off or in an inactive state, program instructions and data may be stored in a long-term memory, for example, a non-volatile magnetic, optical, or electronic memory storage device 216. Either or both of the RAM 214 or the storage device 216 may comprise a non-transitory computer-readable medium holding program instructions, that when executed by the processor 202, cause the device 200 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Figure 3:
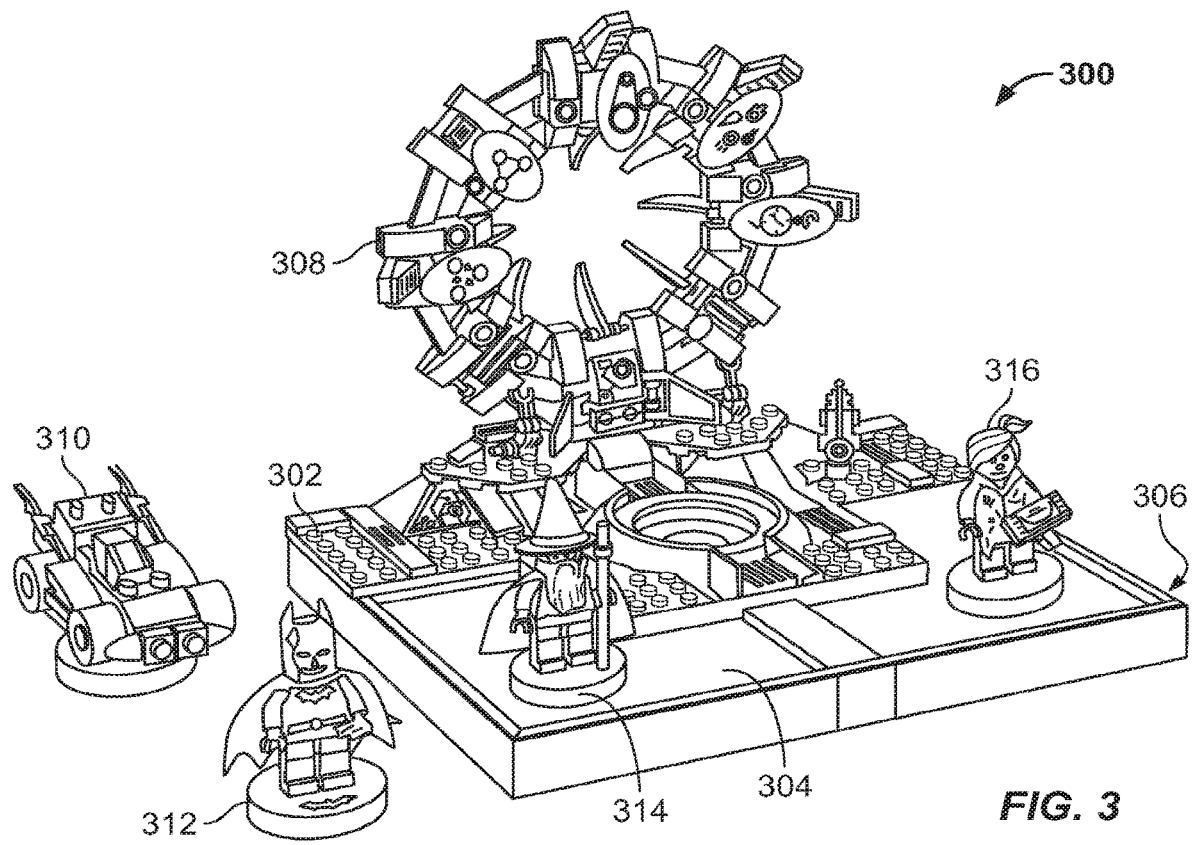
FIG. 3 is perspective view of a portal device with associated toys and character tags.

Referring to FIG. 3, an example of a portal device 300 with accompanying character tags 312, 314 and toys 310, 316 is shown. A base 306 supports a processor, memory and port as previously described in an assembled portal device 300. The processor, memory and port are hidden underneath the base 306, in this view. A pad 304 is coupled to the base 306 and configured for placement and removal of the character tags 312, 314. In an aspect, the character tags can be detached or re-attached from any toy figure by the end user, or used without any attached figure, if desired. The disc-shaped character tags are not intended as toys to be used without an attached toy figure, however. As illustrated, each of the character tags is attached to a different toy figure that matches an RFID identifier in the character tags, which are the disk-shaped tokens shown at the base of the toy figures (from left to right, Batmobile, Batman, Gandalf and Wyldestyle) in FIG. 3. It is believed that most end users will prefer that each provided figure remains attached to its corresponding character tag, during play. Hence, while the present application uses terminology such as "toy sensor" and refers in places to sensing placement of a toy on a portal device, it should be appreciated that this terminology includes sensing a character tag or other identification token that is designed to be attached to a toy, even if the end user can readily remove the toy from the character tag or identification token, as well as for sensing toys that cannot readily separated from an identification token. An identification token may include, for example, an RFID tag or optical code.

The pad 304 is divided into distinct zones (not visible in this view) that are invisible to the user when the device is powered off, but become visible when each of the zones is illuminated with differently-colored light, in response to a control signal from the processor. To provide the illumination, an array of light-emitting devices (not visible in this view) may be fixed in relation to the pad 304 and configured to independently illuminate each of the distinct zones with any one of multiple colors. A multiple-sensor array (not visible in this view) may be coupled to the processor and configured for sensing an identity of one or more character tags 312, 314 placed on the pad and for sensing which of the distinct zones the one or more character tags are placed. For example, an RFID receiver may both detect when a tag 312, 314 is removed from the pad 304 and read an identifier from the tag that correlates to a particular character in a connected game process. The pad 304 may be generally flat. The portal device 300 may include an attachment plate 302 adjacent to the pad 304, configured for attachment of toy interlocking plastic bricks 308.

The end user, typically a child at play, experiences the character of the toy that is attached to its proper tag appearing or leaving the corresponding game, in reaction to the placement or removal of the toy on the pad 306. For example, when the child places the Gandalf 314 and Wyldstyle 316 toys on the pad 304, those characters are unlocked and appear in the video game, while the Batman 312 and Batmobile 310 toys do not appear, because their corresponding character tags are not placed on the pad 304. The child can interact with the video game and solve puzzle challenges by manipulating the toys in and out of different zones of the pad. Some examples of such puzzles are described in connection with FIGS. 5A-10.

Figure 4:
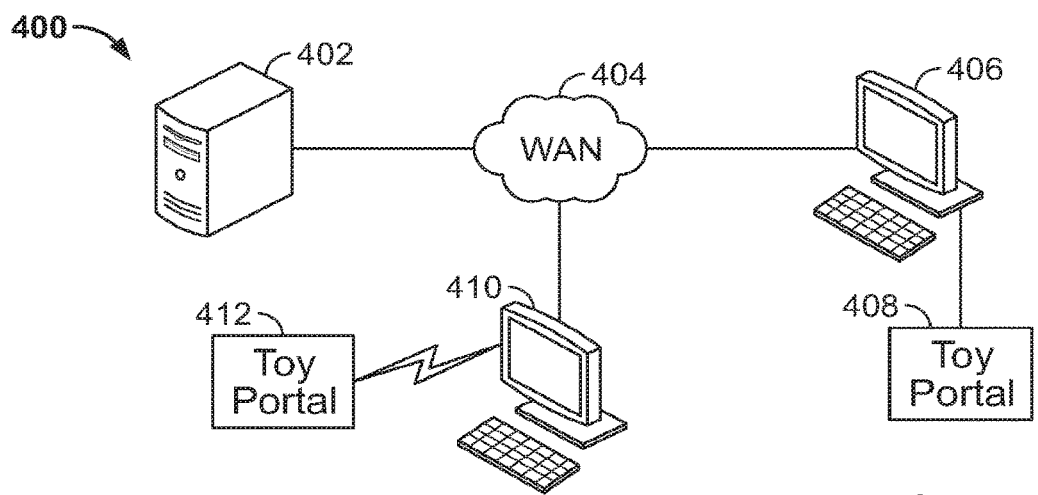
FIG. 4 is a diagram illustrating elements of a system of multiple game computers and portals.

FIG. 4 shows a system 400 comprising multiple game machines 406, 410 in communication via a wide area network (WAN) 404 with a game server 402. The game server 402 may track game play at participating clients 406, 410 and provide multi-player game features, synchronously or asynchronously. Each of the game computers may be coupled to a portal device. The game computer 405 is coupled via a wired connection to a portal device 408, while another computer 410 uses a wireless connection to communicate with its adjacent portal 412. A game process used with the portal device 408 may operate with the computer 405 in an isolated mode. In the alternative, or in addition, the computer 405 may connect via the WAN 404 to the server 402 and/or other computer 410 and play in a socially connected mode.

Examples of video game operation in connection with a physical game portal of the type described above are provided in connection with FIGS. 5A-10 to demonstrate to one of ordinary skill some of the rudimentary capabilities of the novel features of game portal. These novel features include aspects of the game play that depend on interaction between a character tag (toy) and the portal device, in combination with aspects that are independent of interaction with the portal device. The user may also interact with the video game using another input device, for example, keyboard, keypad, game controller, microphone, or camera/camera array. It is anticipated that one of ordinary skill may be able to device and implement considerably more complex and interesting challenges, by learning from these basic examples.

For example, a shift puzzle challenges the user to reposition an avatar between moving platforms to avoid danger and reach an objective. When the shift power is activated, the game process gives the avatar the ability to jump between colored rifts and move from rift to rift. The user activates the shift power by physically moving a character tag to the correctly colored light zone of portal pad, generating a signal that activates the power to shift to the rift of their choice. The user can use this to allow an avatar to avoid danger or traverse areas.

To enable possible shift activation, the game process may require the avatar to enter or interact with a "shift hotspot." A shift hotspot may be placed by the game process in different regions of the video game space, for enabling the user to activate shift style puzzles. Activating a hotspot will place the effect ONLY on the character that activates it. All other characters will not be affected. Once a shift hotspot is activated a glow will appear around the character (or some other form of effect) for indicating that the character in in shift mode. In response to activation of shift mode, the game process sends a signal to the portal device, instructing it to illuminate its zones with different colors and activate its sensor array.

Once a character is in a shift mode, the game process may cause a shift icon to be displayed in the output video, for example, an arrow-shaped icon. If the avatar walks too far away from the activation hotspot then the shift effect will dissipate and the portal will revert back to type, for example, all zones white. All placed items will no longer appear through that color of the portal zones, and instead will just appear with the normal item rules.

Figure 5A:
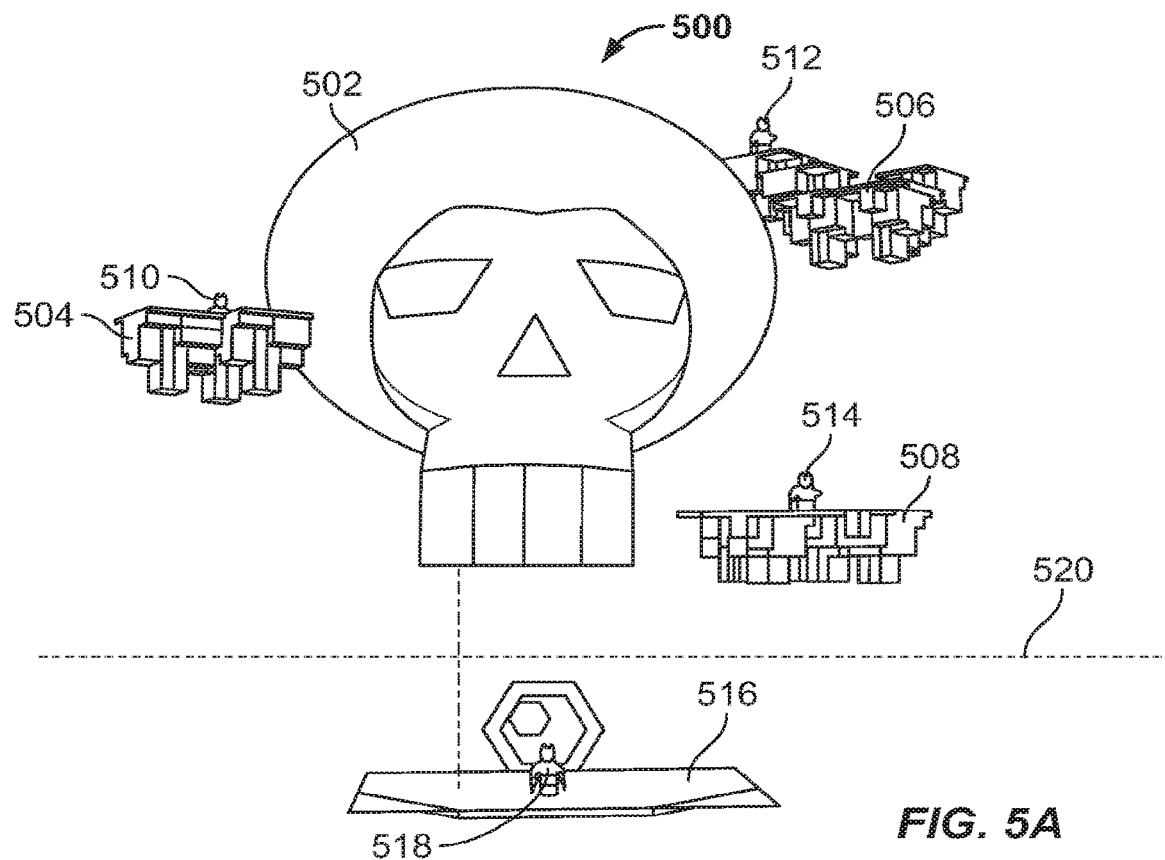
FIGS. 5A-5D are screenshots illustrating aspects of a video game using portal device input to shift characters between rifts.
Figure 5B:
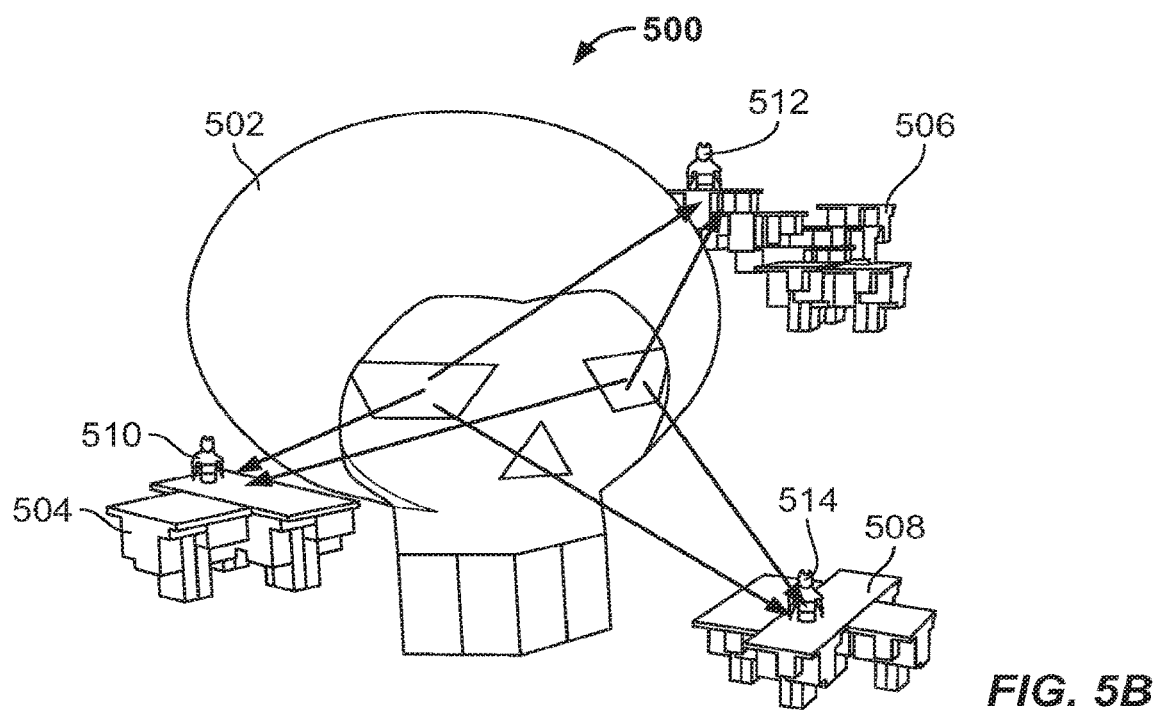
Figure 5C:
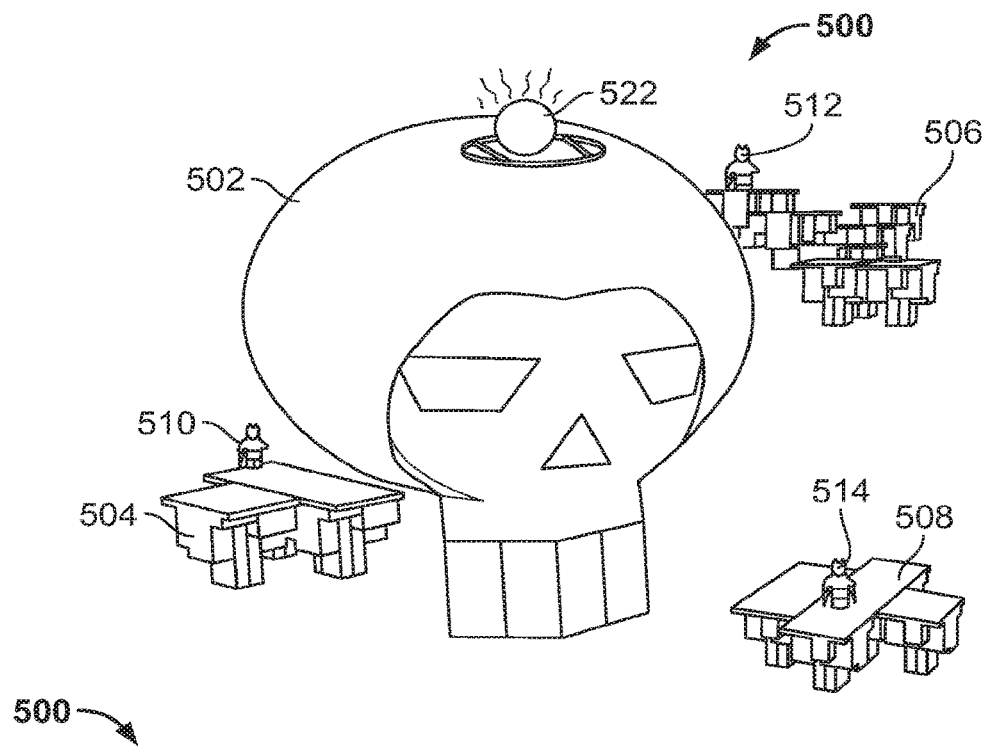

FIGS. 5A-5C show an example of shift play in action, called "SHIFT AFRO SKULL BOSS!" At FIG. 5A, the scene 500 shows the Afro Skull boss 502 present and looming over the avatar 514 in the video game. The pads on the portal device 516 will start to glow to represent the zone is active. The line 520 represents a division between the game process and the real portal device 516 and character tag 518.

At FIG. 5B, the user can now place a character tag 518 on any color zone of the portal device 516 they wish. This causes the portal device to signal the game process, which reacts by shifting the avatar to the rift 512 that matches the color of the zone on the portal device. As the avatar runs around the platform 506 it may build and expand. Once the avatar has gotten to the first platform the eyes of the boss 502 will rotate towards it, and then shoot a laser beam at the platform the avatar is standing on. A laser beam hit may cause the platform to be destroyed all of the way down to one chunk, on which the avatar can be spawned if it is hit or killed. The platforms do rebuild (regenerate) once they are destroyed as the avatar walks across them. Each platform 504, 506, 508 will have a character-specific goal to achieve that in some way overheats ASB (afro skull boss) 502.

Referring to FIG. 5C, once the avatar has dodged the laser and overheated ASB 502 by completing the three puzzles on the three different platforms 504, 506, 508 after shifting the avatar from one to the next and interacting with characters 510, 512, 514, then a core 522 will open atop his head for the finishing blow. The user must use the red rift 506 to allow the avatar to reach the core 522 and score the finishing blow.

Basically, the avatar is using the portal 516 to both generate and spawn to different color rifts to avoid being zapped and to score hits on the boss 502. Once the boss is exhausted the avatar can go on-top and attack the core 522! Upon completion of this the avatar could be automatically warped out of the shift portal they came in from and then it could collapse.

Once the portal is in shift mode, the user can pick up any character from it and then replace them on any colored area, causing the shift portal to alert the game process of this reaction. In reaction to the alert, the game process will cause the corresponding character to appear at the spawn point on that colored area. Any character not removed will stay where it was before shift mode began, so if the user does not move any character tags on the portal, gameplay continues as normal after shift mode is completed. Upon completion of the goal the portal reverts back to its regular game functionality.

Figure 5D:
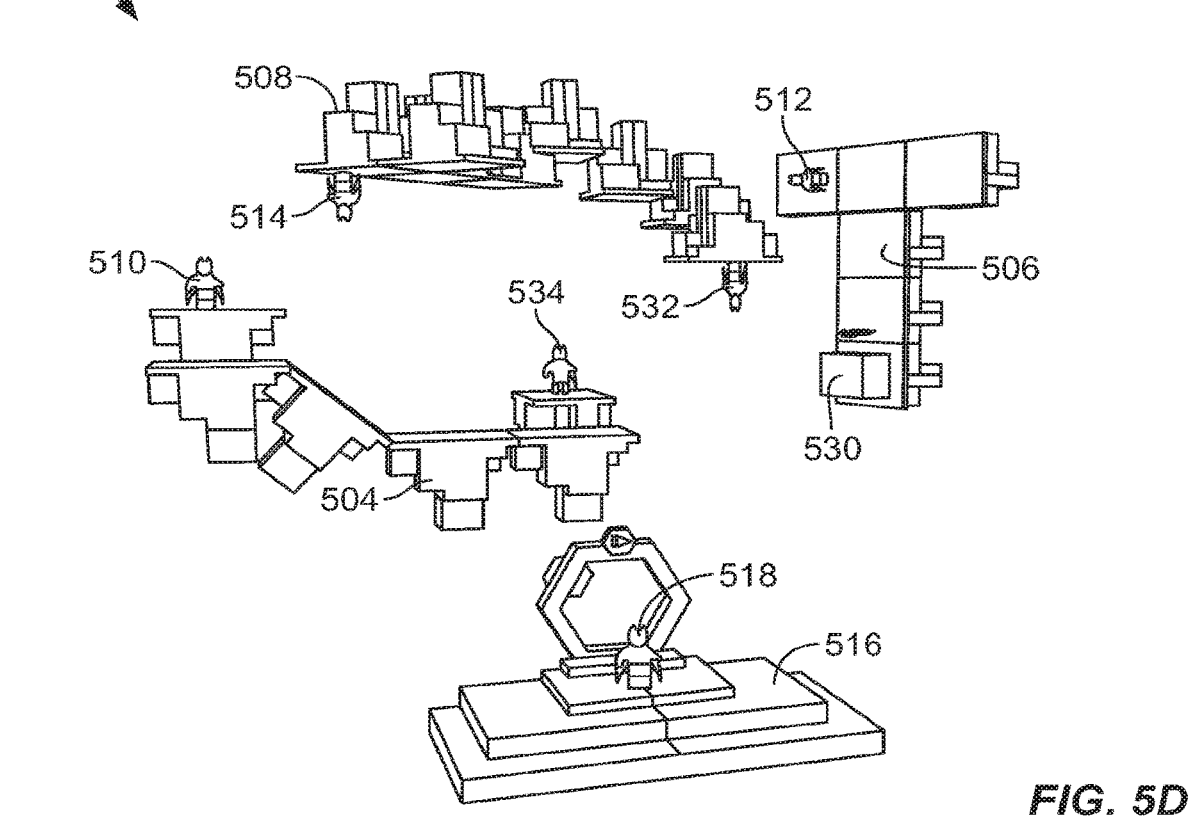

Along with the standard shift, the game process may shift the avatar on platforms of three different axes. FIG. 5D shows how the platforms (rifts) 504, 508 and 506 may be oriented along different axes in the same scene 500. When the user moves the character token 518 onto different zones of the portal device 516, an avatar 532, 534 moves between the rifts, and may interact with other characters 510, 512 and 514, and other objects 510. In this embodiment, the avatar 532, 534 can be shifted to upside down platforms and vertical wall platforms. The camera for rendering the scene 500 may be rotated also to make the corresponding block appear level horizontally up while framing the level from the reference point of the current rift. This shifting of camera viewpoint would avoid strange control swaps and provide interest.

Figure 6:
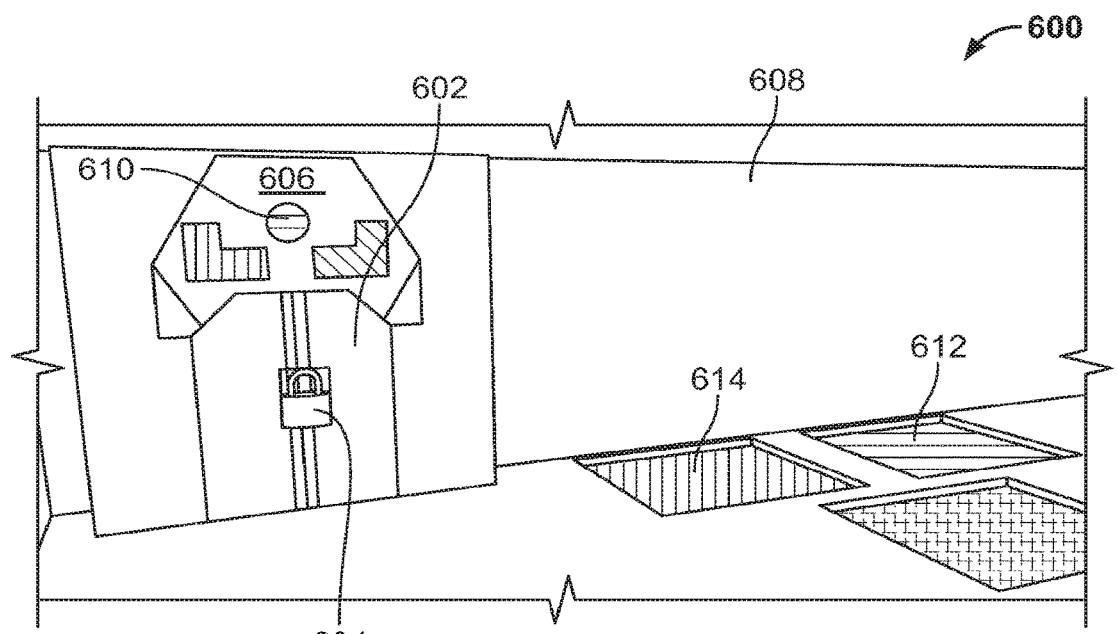
FIG. 6 is a screenshot illustrating aspects of a video game using portal device input to unlock a color sequence lock.

FIG. 6 illustrates an embodiment of a portal device used in conjunction with solving a chroma puzzle. Around the video game scene, the game process will place chroma hotspots indicated by a specific color each. The colors indicating the hotspots may be a set of primary colors, for example, red, yellow and blue. When an avatar enters a hotspot, it retains an "aura" of corresponding color for a while. While the aura is active, the game portal illuminates the zone of the pad on the portal device that a character tag corresponding to the avatar is placed so that it has the same color as the aura in the game process. For example, if the avatar's aura is blue then the zone of the pad where the character tag for the avatar is physically placed will glow blue.

The game process and portal device also enable color blending. For example, if two characters in the game process are adjacent with different colored auras, a blend of the different colors may be illuminated in the pad. For example, if an avatar with a blue aura shares a region of game space with a character having a red aura, the game process may instruct the portal device to illuminate a zone where the character tag for the avatar is positioned with purple light. The rules of the color blending may follow basic color theory: red and blue blend to purple, red and yellow blend to orange, and blue and yellow blend to green.

FIG. 6 illustrates a scene 600 implementing a chroma lock 604 to control egress from a room 608 through a door 602. Chroma locks are places where an energy is preventing the avatar's progress. By using Chroma, the avatar can displace that energy and thus remove the blockage.

For example, above the door 602 a color sequence is indicated in an arrangement of shapes 606. To unlock the door, the user arranges color of zones on the portal device to match that of the sequence 606 above the locked door 602. To make such arrangement, first the user needs to move the avatar to the blue hotspot 614 and red hotspot 612 in room 604, in a sequence coordinated with placement of a corresponding character tag on zones of the portal device. For example, with the character tag located in a first zone of the portal device, the user directs the avatar to the blue hotspot 614, causing the zone to glow with blue light. Then the user may place the avatar's character tag or different character tag on the next zone, and move the corresponding in-game character to the red hotspot 612, causing the next zone to glow red. The user now faces a harder challenge because one of the lights 610 in the sequence is green, and there is no green colored hotspot in the scene.

To overcome this challenge, the user applies the principles of color blending. As the user places a character on the portal device then the zone the avatar's character tag is on will change to the hotspot color. This color is remembered so, for example, the user can illuminate all zones of the portal device with the same color, if desired. When the avatar moves to a different hotspot, it acquires a differently colored aura, causing the zone where the character tag is located to change to the current color. Thus, in one embodiment, to achieve color blending the user places two different characters of different colors on the same zone at the same time! For example, to make green the user or two users playing together place two different character tags in the same zone of the portal device, while directing the corresponding in-game characters to the proper hotspots having the constituent primary colors for the blended color that it is desired to produce.

Figure 7:
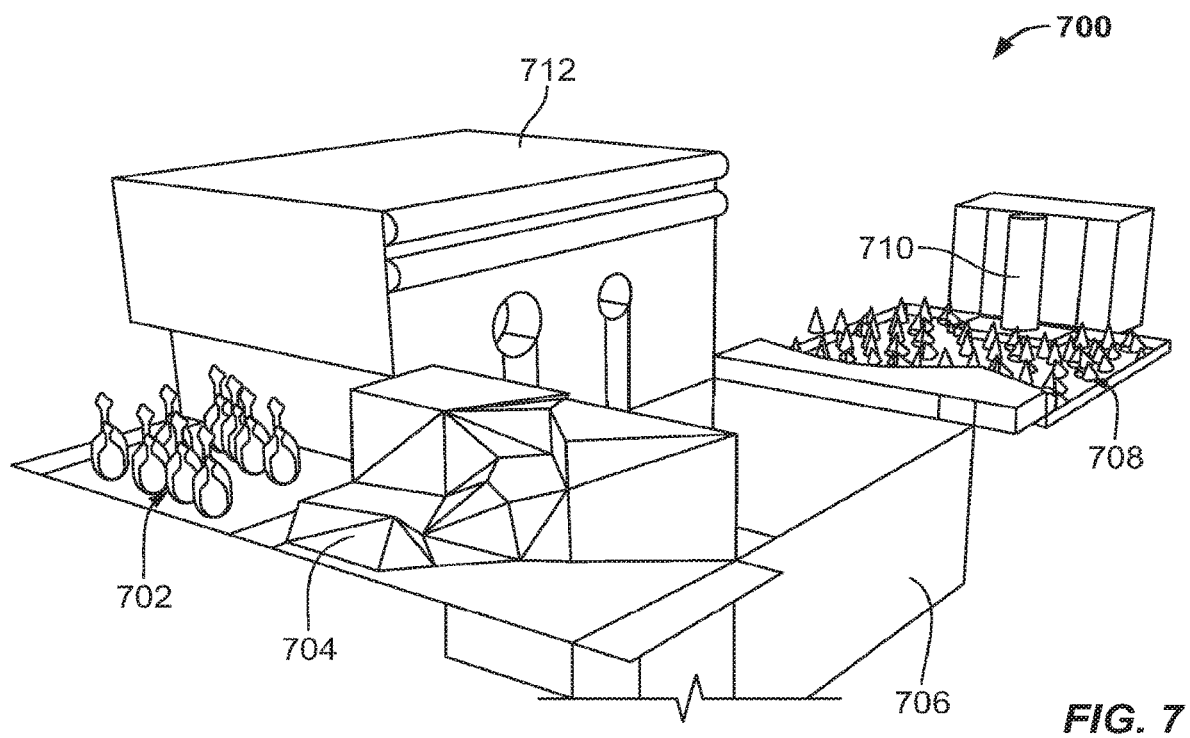
FIG. 7 is a screenshot illustrating aspects of a video game using portal device input to control a character trait, wherein different traits are needed to accomplish different tasks in a quest.

Referring to FIG. 7, a scene 700 illustrates aspects of elemental phase play, in which a color of the portal device zone controls an "elemental" trait of the in-game character, enabling it to overcome obstacles requiring the power afforded by a particular trait. For example, elemental phase play enables an avatar to acquire elemental traits required to overcome the challenges of Fire 702, Ice 704, and Earth 708 of the rift 706 that prevent the avatar from reaching the goal 710. Each time an avatar enters an elemental phase region 702, 704, 708 the zones on the portal device will glow and perform a different function depending on which zone the avatar's character tag is located.

Once elemental phase play is activated, the avatar is initially assigned one character trait (e.g. Ice). Other character traits (e.g., Fire, Earth) can be unlocked during progression of the game. As additional traits are unlocked more colors will be shown on the portal device when the elemental play phase is activated. To unlock additional traits the user moves an avatar to an elemental phase hotspot which causes at least one zone of the portal device pad to glow with the hotspot color. Placing a character tag on that glowing zone will change the current avatar's elemental trait to the trait corresponding to the hotspot color.

For example, an elemental phase puzzle may include a requirement that the user unlock three different elements. A red hotspot changes the avatar's character trait to Fire (human torch). A blur hotspot changes the character trait to Ice (turns the avatar into a cool ice variant). A green hotspot changes the character trait to Earth (the avatar is wrapped in vines and moves around like Dr. Octopus or has venom on tentacles made from plants). When in fire form, the avatar can walk through Fire 702 (passive) or melt ice 704 and set things 712 on fire (active). When in Ice form, the avatar can walk on water creating an ice platform (passive), or form ice blocks from water sources and freeze enemies (active). When in Earth form, the avatar can pass through carnivorous plants and vines (passive) or grow structures out of earth patches (active). When in Lightning form, the avatar can enter electrified panels unharmed (passive) and can power panels and damage enemy (active).

Continuing the foregoing example, a segment of a level 700 may require three elemental phase abilities in a scenario as follows. A base is powered by alien technology, but the power core has been removed. The avatar must find a replacement core that can be obtained at the goal 710. Nearby there is an elemental shift zone 700 the avatar can explore. First, the user must shift the avatar into Fire mode (red pad) to pass through the constant flames 702, by placing the avatar's character tag on a red zone of the portal device. Once past the flames, the avatar must use their fire ability on the massive ice chunks 704 to clear them out of the way by firing at them. Then, once all of the ice 704 is cleared it runs into the water pool behind it. The water pool is already being filled by pipes running out of the structure 712 nearby. The avatar can jump into the water and swim however they will not be able to get out of the other side as the far bank is too high to jump out of. To overcome this challenge, the user can move the avatar's character tag to a blue zone of the portal device, which turns the avatar to Ice mode (Ice trait). In this mode, the avatar can freeze the water and use the surface of the frozen water as a platform to jump off and gain height. Once across the water the avatar will be faced with a pit of carnivorous plants and poison vines 708. The user must place the avatar's character tag on a green zone of the portal device to change the avatar into the Earth form, enabling the avatar to move through the plants 708 and to a grow spot (goal 710) at the back. The grow spot allows them to grow a plant that upon growing and flowing will produce the alien power core they are looking for to complete the level. For further example, enabling a user to shift elemental avatar traits may be applied for overcoming "boss fight" challenges, as a way of avoiding attacks or scoring hits on a boss who constantly swaps out his form from fire/ice/nature/lightning, and so forth.

Figure 8A:
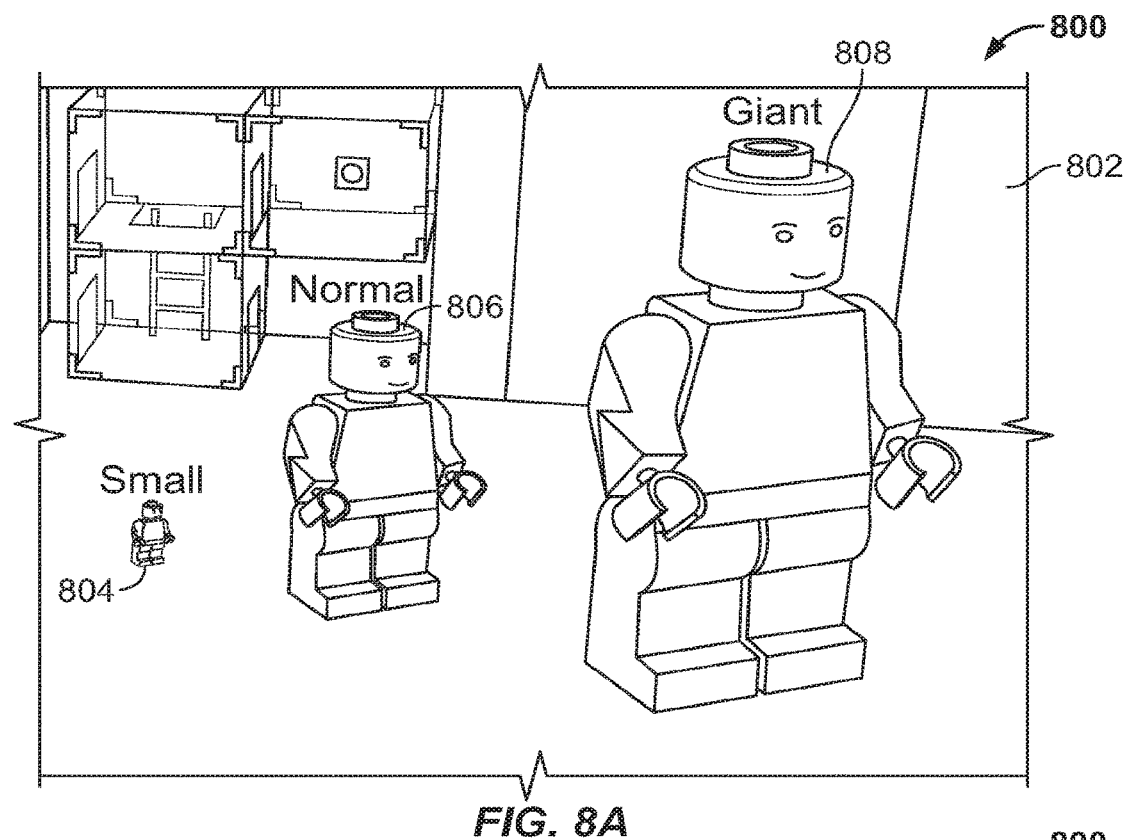
FIGS. 8A-8B are screenshots illustrating aspects of a video game using portal device input to scale a character and solve a puzzle.
Figure 8B:
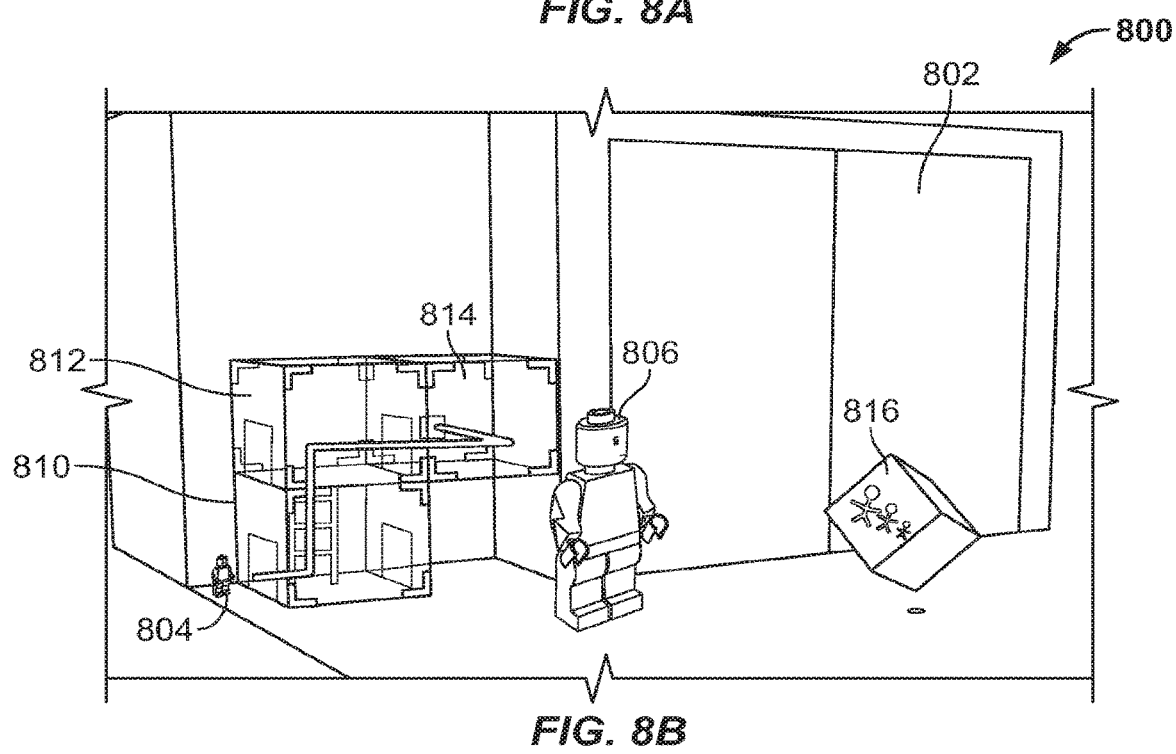

FIGS. 8A-8B illustrate aspects of shifting an avatar's scale trait enabled by a portal device to overcome a challenge of a level 800, using specific examples. Referring to FIG. 8A, a user may direct an avatar to find scale stones placed around a level 802. Scale stones allow the avatar to scale up to super-size or down to small. Using a scale stone will glow the zones of the portal device in three distinct colors. Placing a character on each color may cause in-game effects as described below. By scaling the avatar, the user can complete puzzles placed around the level 800.

Each scale of character may be provided with its own unique powers. For example, an avatar 804 with a "small" trait enabled can fit through small places and get into scale cubes. Small characters can only use small switches and devices as well as fitting into scale cubes. An avatar 806 with a "normal" scale trait as full range of ability and moment. This would be used for if the avatar needed to be small to get to a specific part of the level and then needed to scale up to activate a normal sized switch, for example. An avatar 808 with a "giant" trait enabled can use cracked LEGO™ bricks and can pick-up and move around scale cubes. The giant avatar can also plug in or throw scale cubes to corresponding scale cube slots.

Referring to FIG. 8B, the following example illustrates uses of shrink to overcome a challenge. The avatar 806 comes across a set of scale cubes 810, 812, 814 in a formation near a door 802. The avatar 806 uses the scale stone 816 and activates the portal device. Once activated, the portal device may be configured such that when the user places the avatar's character tag on a left side zone of the portal device, the game process will scale the avatar down. Once scaled down, the avatar 804 can enter the scale cubes 810, 812, 814. For example, the avatar 804 can enter a first cube 810 and climb to an upper level cube 812 using the small ladder in the lower cube 810. Once in the upper level cube 812, the avatar can enter the next upper cube 814 and use the use the small switch located there to open the door 802.

Figure 9A:
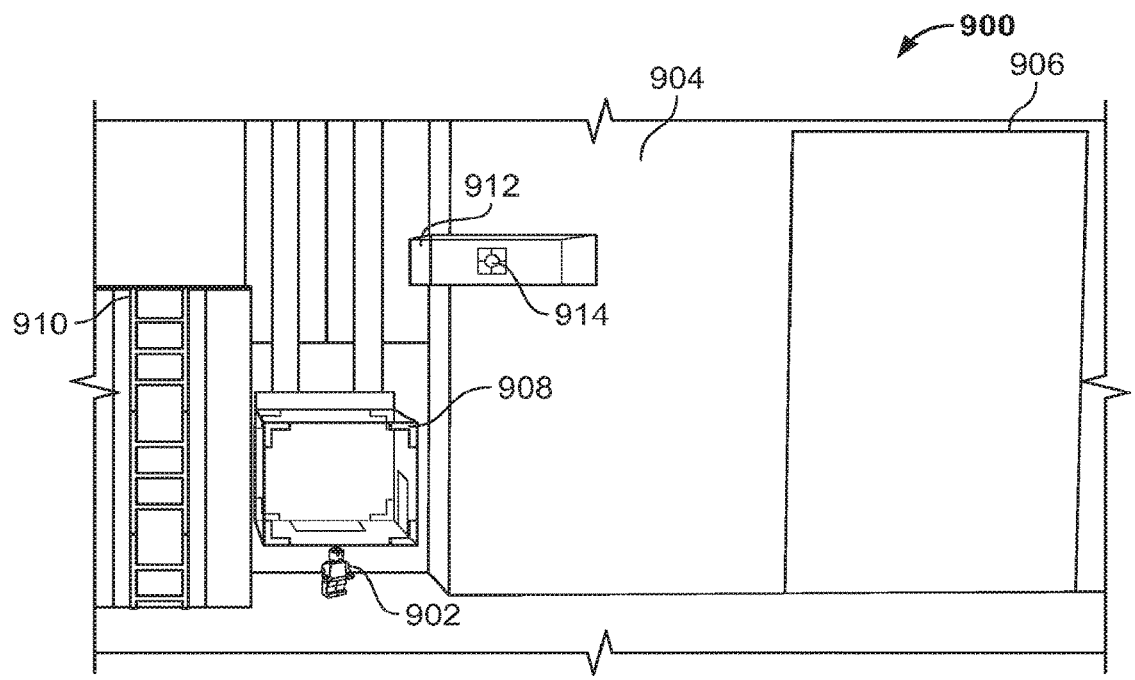
FIGS. 9A-9B are screenshots illustrating further aspects of a video game using portal device input to scale a character and solve another puzzle.
Figure 9B:
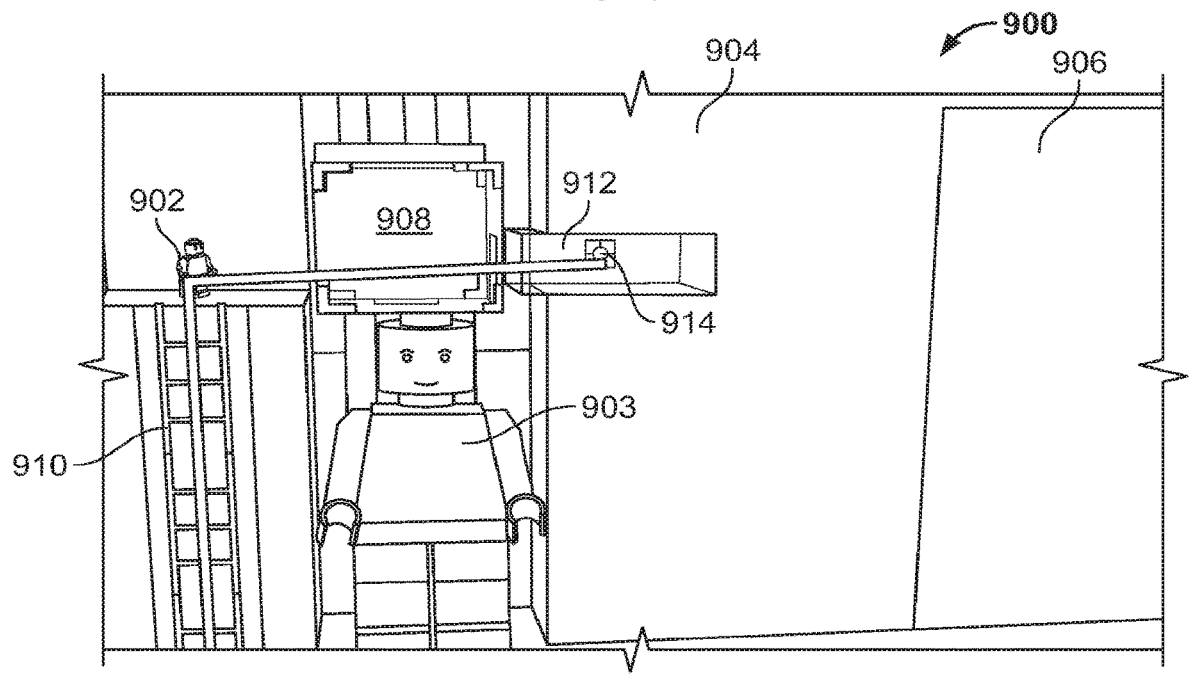

For further example, FIGS. 9A-9B illustrate uses of shrink and grow combined to overcome a challenge in a level 900. A scale cube 908 on rails is lowered down low enough for a small avatar 902 to stand under. Nearby is a ladder 910 and inside a small glass tunnel 912 is a switch 914 to open the door 906. The game process may provide a scale stone (not shown) in the level 900 for activating the scale function based on avatar interaction. Using the scale stone, the avatar can become big\small\normal depending on which zone of the portal device its character tag is located. Making itself small, the avatar 902 can fit under the scale cube 908.

Referring to FIG. 9B, while under the scale cube 908 the user can grow the avatar 903 to a giant scale using the postal device as previously described. As the avatar 903 grows in scale, it pushes the cube 908 up its rail to its desired location, where the cube 908 bridges a gap between a ladder platform on the left and the tunnel 912 where the switch 914 is located. With the giant avatar 903 in position, the user may shift focus to another character 902 and place that character's tag on a "shrink" zone of the portal device, which causes the game process to shrink the avatar 902 so it use the ladder 910. Arriving at the upper area of the ladder 910, the avatar 902 can now enter the scale cube 908 that the giant character 903 is holding in place. Passing through the cube 908, the avatar 902 can reach the switch 914 and open the door.

Figure 10:
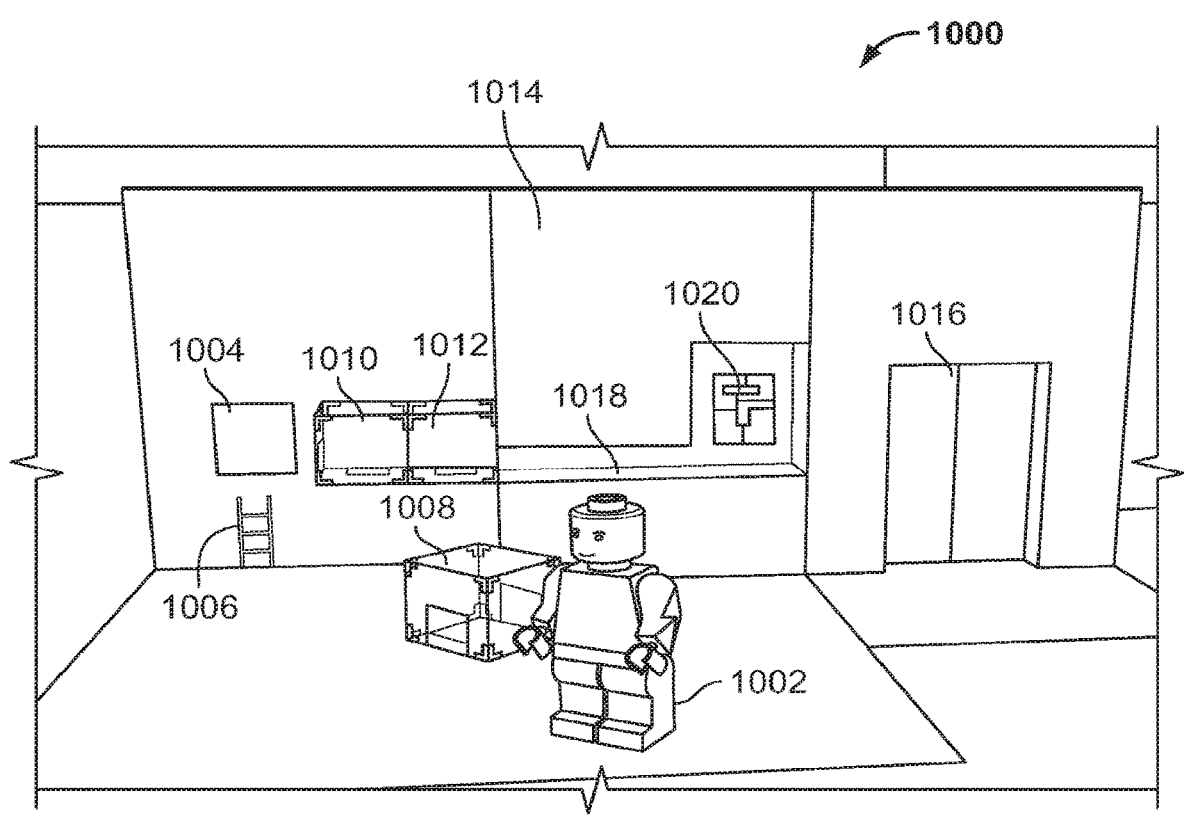
FIG. 10 is a screenshot illustrating further aspects of a video game using portal device input to scale a character and solve another puzzle.

Referring to FIG. 10, another example of a scene 1000 for using a giant scale character trait is illustrated. The giant scale trait provides the avatar with the ability to pick up or plug in scale cubes to allow a character with a "small scale" trait to use them. As stated above, a character with the giant scale trait also has super strength. However, a new and unexpected utility for the giant scale trait is the ability to move the scale cubes around to solve different puzzles. A scale cube may contain a character with the small trait applied when the cube is moved, enabling solutions to otherwise unsolvable problems.

For example, FIG. 10 shows a scene 1000 wherein a scale cube 1008 is out of the wall and on the floor. A character 1002 with a giant scale trait applied can carry this cube 1008 while a small character (not shown) is in it or without a small character in it. The giant character 1002 can place the cube 1008 where desired or throw it towards a specific target, for example towards the orange plate 1004 on the wall 1014. When a cube is picked up it will orientate itself to make sure that when it is thrown will be placed in the desired orientation, for example, so that its connection doors are aligned with the adjacent cube 1010 or other desired pathway.

The puzzle illustrated in FIG. 10 includes the giant character 1002 picking up and throwing the cube 1008 at the plate 1004. A small scaled character can then climb the ladder 1006 or enter the cube 1008 before it is picked up and thrown, then traverse the already placed cubes 1010 and 1012 into the glass corridor 1018 in the wall. Once on the corridor 1018, the small character can move to the right and find the switch 1020. The switch 1020 however is a normal-sized lever that is too large for a small-scaled avatar to activate. Accordingly, the user may use the portal device to scale the small avatar up to normal size, and then activate the switch 1020, opening the door 1016 to enable exiting from the level 1000.

A further application for a portal device with sensor zones that can be illuminated in different colors is to help guide an avatar in an in-game process. For example, on certain game levels the game process will provide a locator hot-spot. When an avatar interacts with the locator hotspot, the game process will communicate with the portal device, which in response illuminates the zone lighting in a pattern to be described. The avatar can be highlighted with an aura or other special effect with the locator hotspot is activated. The pattern of zone lighting can be arranged to guide the avatar to an invisible goal in the game level, as in a game of "hot 'n cold."

For example, as the user moves an avatar around a level, the zone lighting may provide an indication when the avatar is moving nearer to the invisible goal. For example, if a zone on the left side of the portal device starts glowing brighter, this may be an indication that the invisible goal is to the left of the avatar in the current view of the game. Likewise, if a zone to the right is glowing, the goal is to the right of avatar. Similarly, front and back zones can be illuminated to indicate that the goal is in front of or behind the avatar. Once the avatar has reached the location of the hidden goal, the entire pad (all zones) of the portal device may glow. In some embodiments, once the goal is reached a rift may open to admit an object from a different rift, such as an object that seems out of place in the present scene. The avatar can then use the alien object to complete a puzzle or satisfy an objective.

Figure 11:
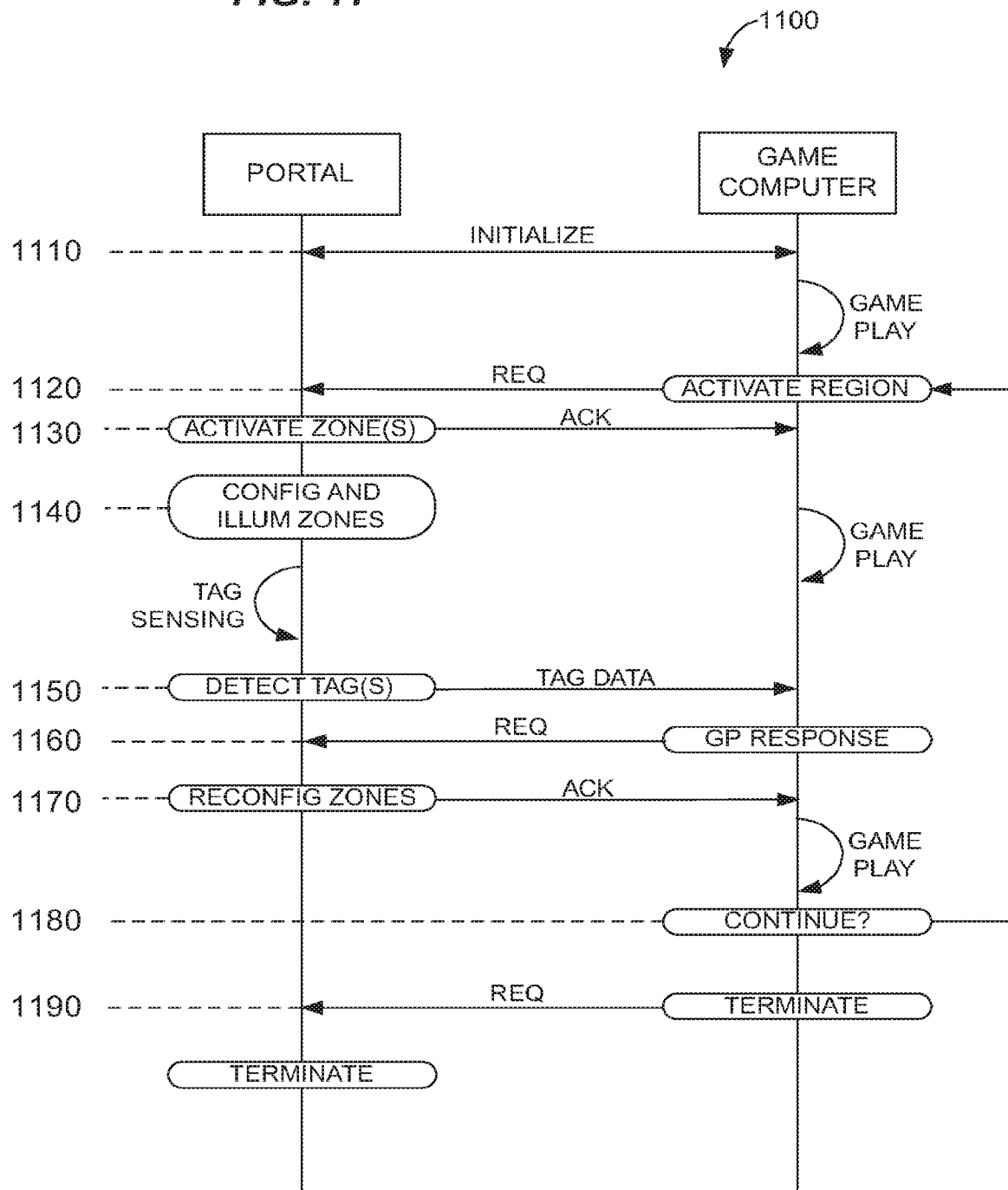
FIG. 11 is a sequence diagram illustrating aspects of coordination between a portal device and a computer operating a video game.

FIG. 11 is a sequence diagram illustrating a generalized use case 1100 involving communication and coordination between a portal device (at left) and a game computer (at right) that encompasses the forgoing game play examples. More detailed aspects of programming the examples should be apparent from the use case, to one of ordinary skill. At line 1110, the portal and game computer may exchange messages to initialize a game session. For example, a game process may receive an interrupt when a portal device is connected to the computer on which the process is running and send an initialization message to the portal device to which the portal device responds with an acknowledgment. For further example, when a game process initiates it may check for a connected portal device, and if found, send an initialization message to the portal.

The game process proceeds until it reaches a state (e.g., avatar interaction with a hotspot, scale cube, or other event) in which a region or level is activated for play that involves the portal device. Thus, at line 1120, the game computer activates a zone in the game process and sends a configuration request to the portal device. At line 1130, the portal device responds by activating its sensor array for sensing placement of character tags and sends an acknowledgement back to the game computer. At line 1140 (which may be contemporaneous with line 1130), the portal device configures the zones, for example by illuminating the zones according to a color scheme that facilitating the intended type of play, for which some examples have already been given above. Subsequently the portal device sensing any tags that are already placed and monitors for changes in zone placement, such as for example the transfer, addition, or removal of any character tag from the zone, while game play continues by the game computer.

At minimum, sensing includes identifying which character tag is placed in which zone, and relative times of placement and removal. Time sensing may be implicit, for example by signaling any changes in placement immediately after detection of the change. At line 1150, the portal device detects one or more tags places in a sensing zone and provides the game computer with information pertinent to the applicable game process. This may include, for example, the identity of detected tags and which zone, or the color of the zone, on which a tag has been placed, or from which it has been removed.

Based on receiving the sensed data from the portal device, at line 1160, the game computer implements an appropriate game play response. Again, various examples of responses (e.g., shifting, providing traits, or unlocking a chroma lock) have been provided above. In some embodiments, for example, when implementing a locating protocol, the game computer may send a second configuration request to the portal device. At line 1170, after receiving the reconfiguration requests, the portal device may reconfigure its zones and acknowledge as before. At line 1180, if game play is not finished, the use case loops back to line 1120. At line 1190, once the game process is terminated then the game portal may also terminate and enter a dormant or powered off state.

Figure 12:
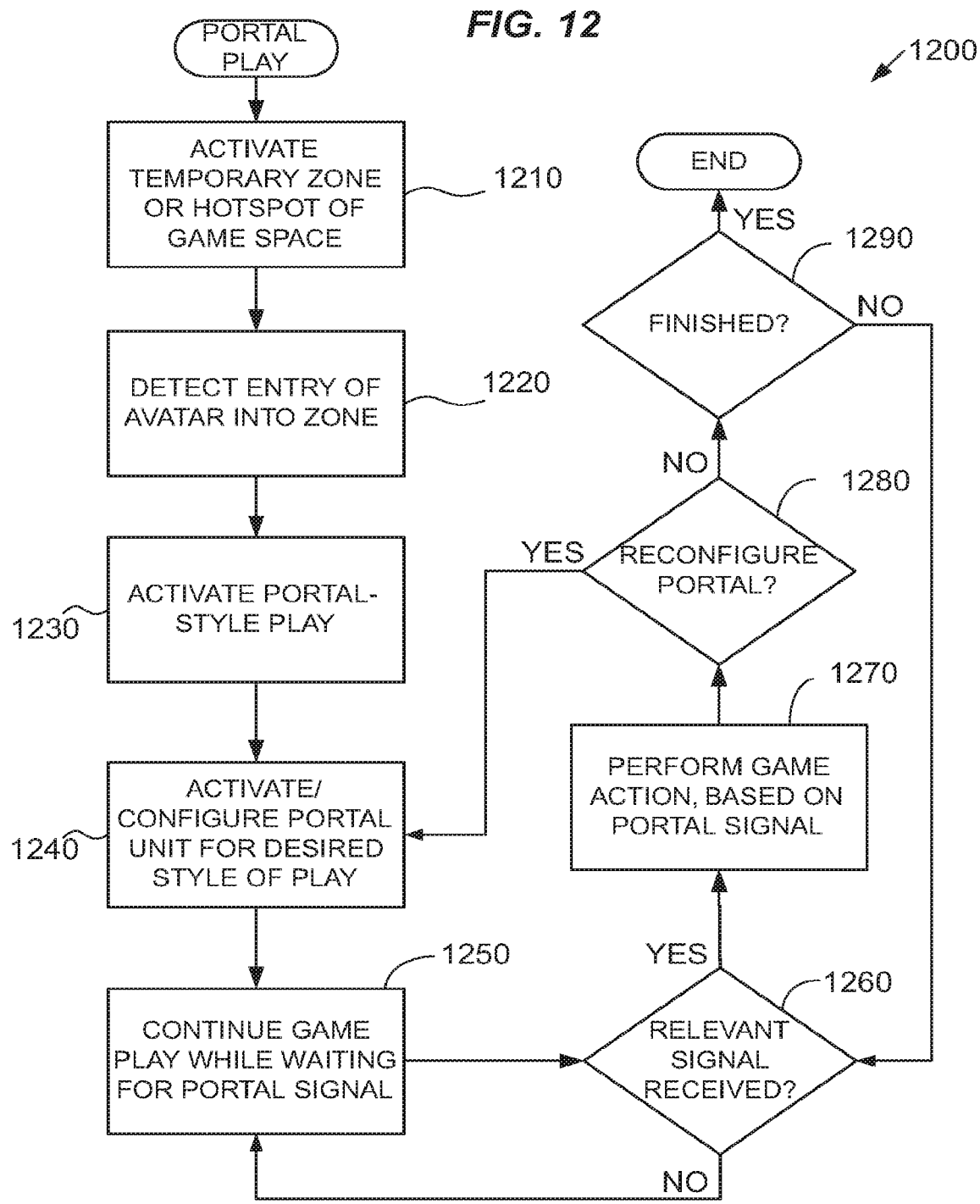
FIG. 12 is a flow chart illustrating a process by a computer operating a video game on cooperation with a portal device.

For the same general portal play use case, FIG. 12 illustrates operations of a game process 1200 by a game computer in cooperation with a portal device. At 1210, the game computer activates a temporary zone, hotspot, or object (e.g., a scale cube) or level of a game process. At 1220, the game computer detects entry of an avatar into the activated zone, region or level, or interaction with a trigger object, or any other predefined event that triggers a portal-involved segment of play. Examples of trigger events have been provided above. At 1230, in response to detecting the triggering in-game event, the game computer activates a portal style of play by loading or linking to a designated game play module. At 1240, the game computer sends a trigger message to a connected portal device, including all required configuration information for the portal. The required information will depend on system design. For example, portal devices may be preconfigured for different modes and the information may merely indicate a selected mode. In the alternative, or in addition, the configuration information may include detailed operational parameters for the portal device, for example the color of each zone. At 1250, the game computer continues game play while waiting to receive data from the portal device.

At 1260, once the game computer receives a relevant signal (e.g., a signal containing information that will change the game state), at 1270 the game computer processes the received information to change the game state. At 1280, if the state of game play calls for reconfiguring the portal, the process 1200 may loop back to block 1240. If the portal is to continue in its current configuration and the game is not finished at block 1290, the process 1200 may loop back to block 1260 or 1250. If the portal play portion of the game is finished, the process 1200 terminates.

Figure 13:
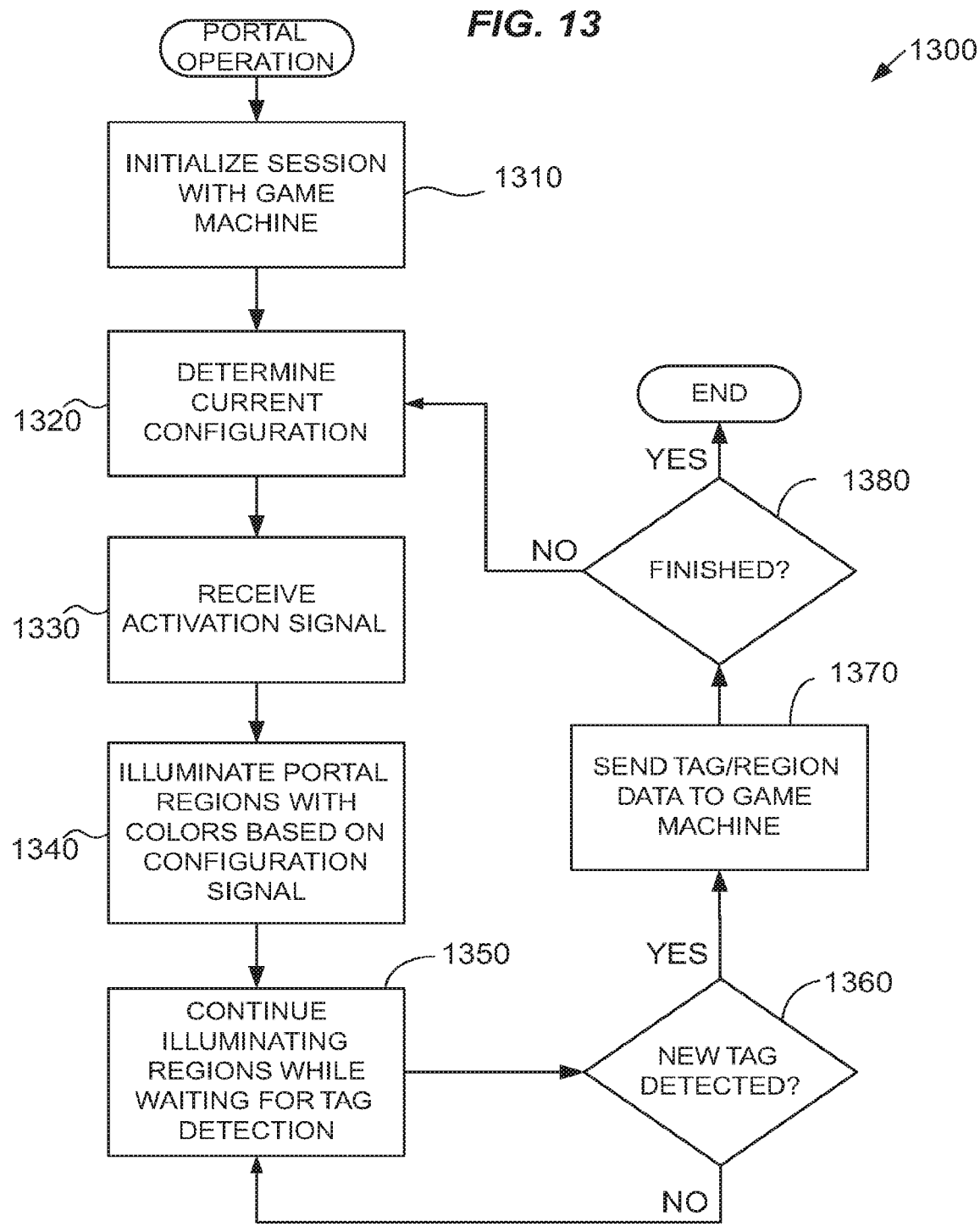
FIG. 13 is a flow chart illustrating a process by a portal device cooperating with a computer operating a video game.

Again illustrating an aspect of the prior use case, FIG. 13 illustrates operations 1300 by a portal process in cooperation with a game computer. At 1310, the portal device initializes a session with a game computer, for example in response to connecting to a game process via a wired or wireless connection, or in response to receiving a signal from a game process indicating the game is entering a portal play mode. At 1320, the portal device determines (sets) its current configuration, based on a predetermined configuration for an indicated style of play, and/or based on detailed configuration parameters received from the game computer. At 1330 (which may be contemporaneous with block 1320), the portal device receives an activation signal indicating that the connected game process has initiated a portal-involved style of play. At 1340, the portal device illuminates its different zones (regions) with a color, or with different colors, based on its current configuration. At 1350, the portal device continues illuminating its zones (regions) while activating its sensors and waiting to sense any proximate character tags. Once detecting any change in tag placement (e.g., placement of a new tag, movement of a tag to a different zone, or removal of a tag) at 1360, the portal device sends tag and region information to the game machine at 1370. For example, the portal device sends an identifier for each detected tag and for the region on which the tag is located (and/or a color indicator for that region) to the game computer, as soon as possible after detecting any change in tag placement. At 1380, if the portal play session is finished, the process 1300 terminates; if not, the process may loop back to block 1320 or other appropriate block, for example to block 1350.

In view the foregoing, and by way of additional example, FIGS. 14-16 show aspects of a method 1400 or methods for a video game process in conjunction with a portal device. The method 1400 may be performed by at least one processor of a game computer executing a video game process that manipulates an avatar relative to a game space in response to user input.

Referring to FIG. 14, a computer-implemented method for a video game process in conjunction with a portal device may include, at 1410, sending, by at least one processor of a game computer, an activation signal to a portal device that is communicatively coupled to the game computer, wherein the activation signal is configured for requesting activation of multiple toy sensors each associated with a different one of distinct toy placement zones of the portal device. Sending may include, for example, transmitting a signal over a wired or wireless interface to a portal device that is locally-situated with respect to the end user display of the game process. The element of "configured for requesting activation of multiple toy sensors each associated with a different one of distinct toy placement zones of the portal device" may be fulfilled by formatting the signal to comply with the application program interface (API) of a portal device that is equipped with multiple toy sensors each associated with a different one of distinct toy placement zones, examples of which are described herein.

The method 1400 may further include, at 1420, receiving, by the at least one processor, a portal output signal from the portal device, wherein the portal device determines the portal output signal based on at least one toy identifier for a corresponding at least one toy and an associated one or more of the distinct toy placement zones that the at least one toy identified by the at least one toy identifier is placed in. The portal output signal may include an explicit or implicit indication of the toy identifier, and an explicit or implicit indication of the zone in which the toy identifier is placed. The method 1400 is intended for synchronous operation with a video game. Hence, the signal of operation 1420 should be received as soon as possible after the character tag is sensed in a zone that is relevant to game play.

The method 1400 may include, at 1430, determining, by the at least one processor, a change in game state of the video game process, based on the portal output signal. For example, any one of the use case examples provided above, in which placement of a character tag on a particular colored zone of the portal causes an in-game result, may be implemented. The game process algorithm may process data from the portal device and compute a result. The method 1400 may include, at 1440, changing the game state resulting from the determination.

The method 1400 may include any one or more of additional operations 1500 or 1600, shown in FIGS. 15 and 16, in any operable order. Each of these additional operations is not necessarily performed in every embodiment of the method, and the presence of any one of the operations 1500 or 1600 does not necessarily require that any other of these additional operations also be performed.

Referring to FIG. 15 showing certain additional operations for determining a game state 1500, the method 1400 may further include, at 1510, shifting an avatar to a different one of multiple rifts based on a color assigned to the associated one or more of the distinct toy placement zones. Further aspects of the operation 1510 should be apparent from the shift use case discussed about in connection with FIGS. 5A-5D, for example. In addition, the method 1400 may include, at 1520, setting a key color for unlocking a color-pattern lock based on colors assigned to one or more characters in the video game process wherein each of the one or more characters is mapped to a different one of the at least one toy identifier, and further based on the associated one or more of the distinct toy placement zones that the at least one toy identified by the at least one toy identifier is placed in. Further aspects of the operation 1520 should be apparent from the chroma key use case discussed about in connection with FIG. 6, for example. In addition, the method 1400 may further include, at 1530, setting the key color at least in part by selecting, by the processor, a color based on a mix of different primary colors assigned to different ones of at least two of the one or more characters. Further aspects of the operation 1530 should be apparent from the chroma key use case discussed about in connection with FIG. 6, namely the discussion concerning blending of colors. In short, the game process enables the user to blend two primary colors using the portal device and at least one character tag to obtain a blended color for which no hotspot in the level exists.

Referring to FIG. 16 showing certain additional operations 1600, the method 1400 may further include, at 1610, determining the change in game state information at least in part by setting a variable trait of a character based on a color value determined from the portal output signal. Examples of variable traits may include, for example, the elemental traits discussed in connection with FIG. 7, and the scale traits discussed in connection with FIGS. 8A-10. For example, in an aspect of the method 1400, at 1620 the variable trait is a mode of play (e.g., elemental mode) that is assignable to different characters. For further example, in an aspect of the method 1400, at 1630 the variable trait is a scale of the character in the video game. In another aspect, the method 1400 may include at 1640, sending the color determination signal to the portal output device, configured for determining a color used to illuminate each of the distinct toy placement zones. The aspect of "configured for determining a color" may include both explicit and implicit indication of desired zone colors by the game machine, using any suitable technique for transferring information from one machine to another in a synchronous fashion without human-noticeable delay. For example, the portal device may be connected to the game computer by a serial connection, and the recited "sending" may be performed by providing configuration data to a transport layer for transmittal from a serial port to which the portal device is connected.

Figure 17:
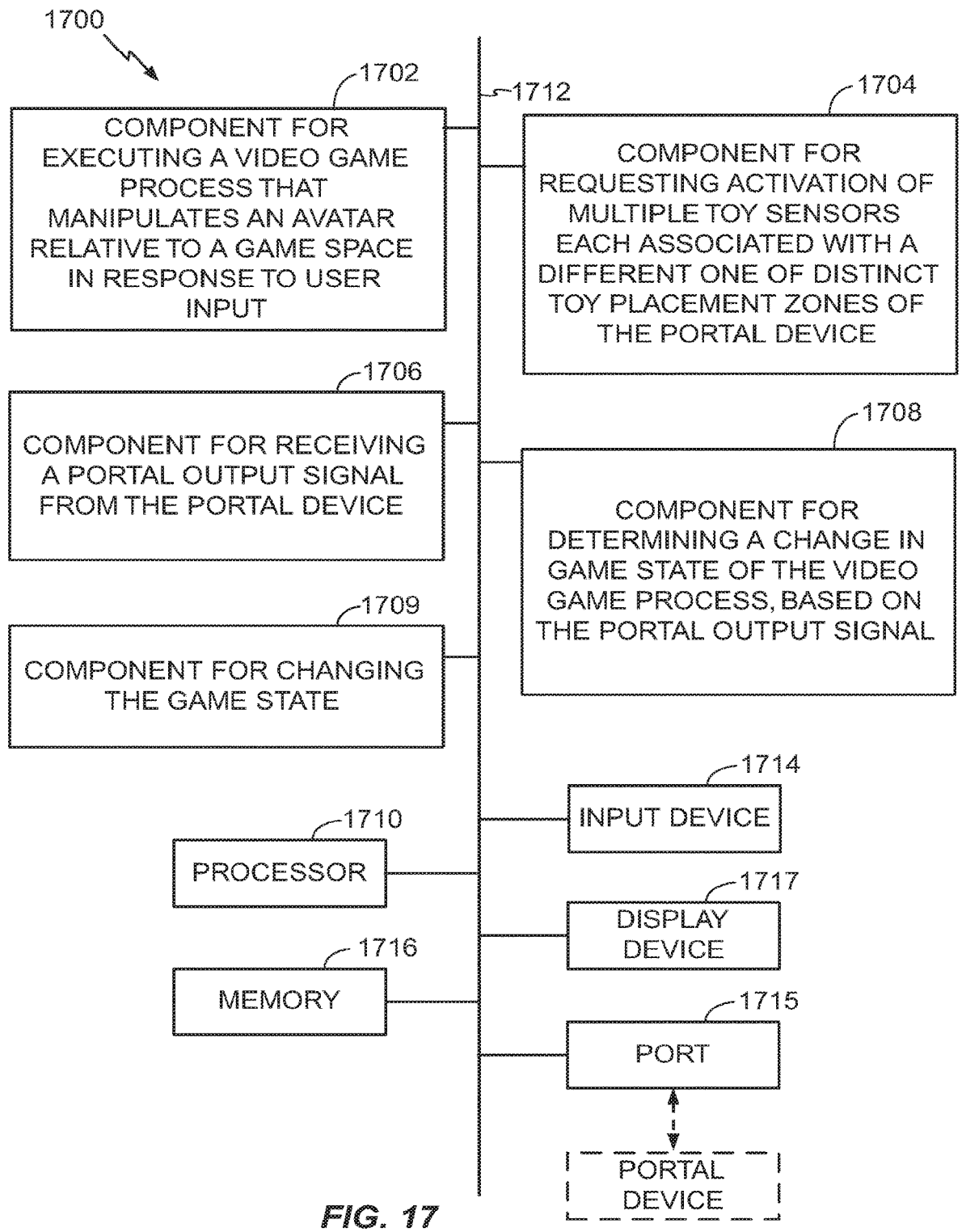
FIG. 17 is a functional block diagram illustrating components of an apparatus or system for using portal device input in a video game process.

FIG. 17 is a conceptual block diagram illustrating components of an apparatus or system 1700 for a video game process in conjunction with a portal device, as described herein. The apparatus or system 1700 may include additional or more detailed components for performing functions or process operations as described herein. For example, the processor 1710 and memory 1716 may contain an instantiation of a game process as described herein above. As depicted, the apparatus or system 1700 may include functional blocks that can represent functions implemented by a processor, software, or combination thereof (e.g., firmware).

As illustrated in FIG. 17, the apparatus or system 1700 may comprise an electrical component 1702 for executing a video game process that manipulates an avatar relative to a game space in response to user input. The component 1702 may be, or may include, a means for said executing. Said means may include the processor 1710 coupled to the memory 1716, the port 1715, display device 1717 and input device 1714, the processor executing an algorithm based on program instructions stored in the memory. Such algorithm may include a sequence of more detailed operations, for example, initiating a game state, changing the game state based on a set of rules operating on a most recent prior game state and user control input, and generating a video output frame based on the most recent game state at periodic intervals.

The apparatus 1700 may further include an electrical component 1704 for requesting activation of multiple toy sensors each associated with a different one of distinct toy placement zones of a portal device. The component 1704 may be, or may include, a means for said requesting. Said means may include the processor 1710 coupled to the memory 1716 and to the port 1715, the processor executing an algorithm based on program instructions stored in the memory. Such algorithm may include a sequence of more detailed operations, for example, generating a configuration signal based on a predefined API that requests activation of a portal device sensor array, and providing the configuration signal to a transport layer for the port 1715.

The apparatus 1700 may further include an electrical component 1706 for receiving a portal output signal from the portal device responsive to the activation request. The component 1704 may be, or may include, a means for said receiving. Said means may include the processor 1710 coupled to the memory 1716 and to the port 1715, the processor executing an algorithm based on program instructions stored in the memory. Such algorithm may include a sequence of more detailed operations, for example, receiving data at an application layer, parsing the data and data header, and determining a significance of the data based on the data header and data arrangement.

The apparatus 1700 may further include an electrical component 1708 for determining a change in the game state of the video game process, based on the portal output signal. The component 1708 may be, or may include, a means for said determining. Said means may include the processor 1710 coupled to the memory 1716, the processor executing an algorithm based on program instructions stored in the memory. Such algorithm may include a sequence of more detailed operations, for example, shifting a player to a different rift, obtaining a color for a chroma lock, changing a character trait such as an elemental play mode or character scale, or other game play operations as disclosed herein.

The apparatus 1700 may further include an electrical component 1709 for outputting data for changing the game state, based on the determining. Said means may include the processor 1710 coupled to the memory 1716, and to the input device 1714, the processor executing an algorithm based on program instructions for game play stored in the memory. Such algorithm may include a sequence of more detailed operations, for example, modifying variables of the game process rules based on the data from the portal device, determining an updated game state based on the modified process rules and user input, and updating a data array based on the updated game state.

The apparatus 1700 may optionally include a processor module 1710 having at least one processor. The processor 1710 may be in operative communication with the modules 1702-1709 via a bus 1712 or similar communication coupling. The processor 1710 may effect initiation and scheduling of the processes or functions performed by electrical components 1702-1709.

In related aspects, the apparatus 1700 may include a network interface module (not shown) operable for communicating with system components over a computer network, instead of or in addition to the port 1715. A network interface module or port 1715 may be, or may include, for example, an Ethernet port or serial port (e.g., a Universal Serial Bus (USB) port). In further related aspects, the apparatus 1700 may optionally include a module for storing information, such as, for example, a memory device 1716. The computer readable medium or the memory module 1716 may be operatively coupled to the other components of the apparatus 1700 via the bus 1712 or the like. The memory module 1716 may be adapted to store computer readable instructions and data for effecting the processes and behavior of the modules 1702-1709, and subcomponents thereof, or the processor 1710, or the method 1400 and one or more of the additional operations 1500-1600 disclosed herein. The memory module 1716 may retain instructions for executing functions associated with the modules 1702-1709. While shown as being external to the memory 1716, it is to be understood that the modules 1702-1709 can exist within the memory 1716.

Figure 18A:
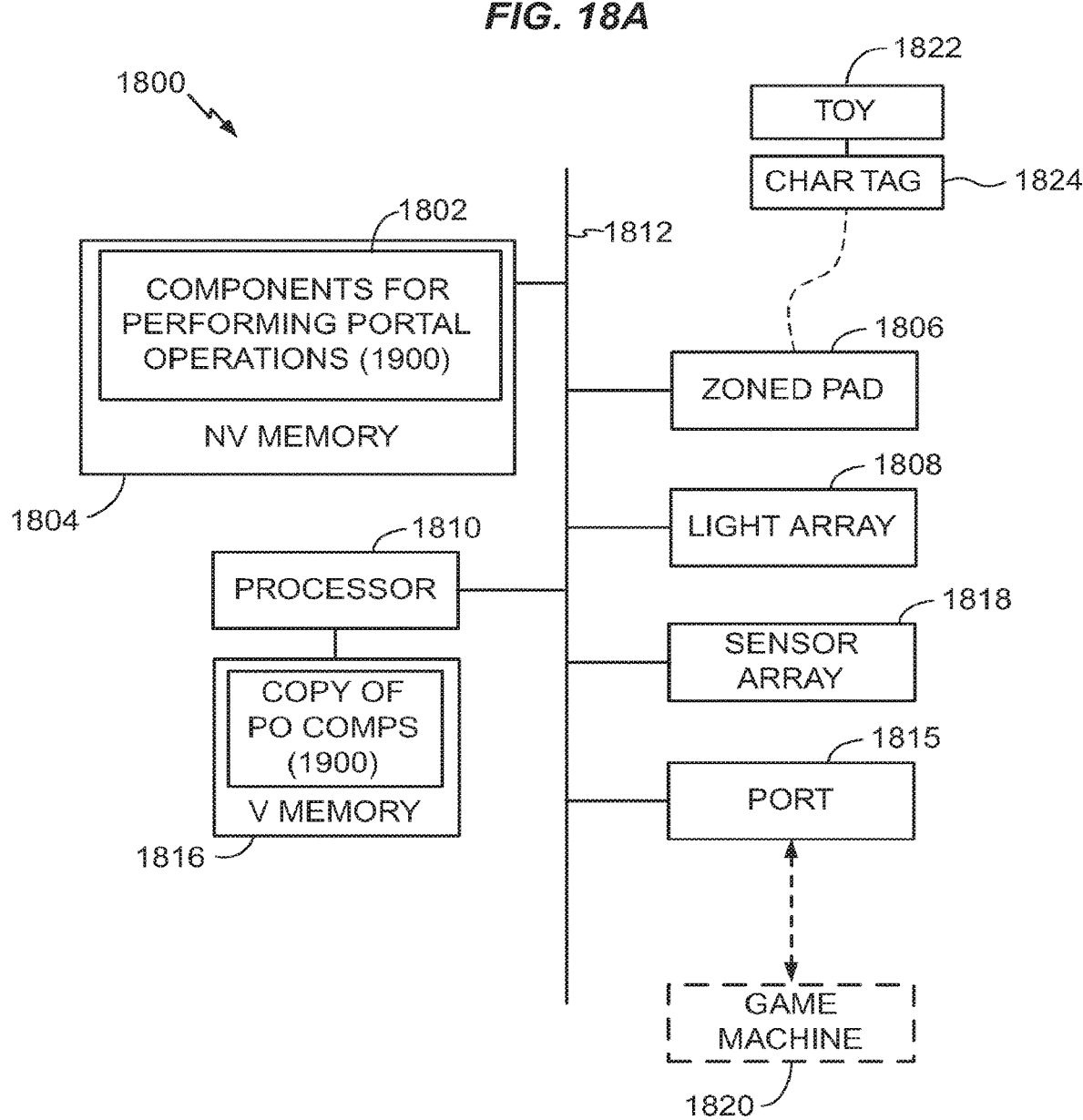
FIGS. 18A-18B are functional block diagrams illustrating components of an apparatus or system for operating portal device in cooperation with a video game process.

FIG. 18A is a conceptual block diagram illustrating components of an apparatus or system 1800 for providing portal device functions in connection with a game process, as described herein. The apparatus or system 1800 may include additional or more detailed components for performing functions or process operations as described herein. For example, the processor 1810 and memory 1816 may contain an instantiation of a process for performing portal device operations as described herein above and below. As depicted, the apparatus or system 1800 may include functional blocks that can represent functions implemented by a processor, software, or combination thereof (e.g., firmware).

As illustrated in FIG. 18A, the apparatus or system 1800 may comprise electrical components 1802 for performing portal device operations that will be summarized below in connection with FIGS. 19-20. The component 1802 may be, or may include, a means for performing one or more of said operations. Said means may include the processor 1810 coupled to the non-volatile memory 1804 holding the components 1802, to volatile memory 1816, and port 1815, the processor executing an algorithm based on program instructions read into the memory 1816 at run time from storage in the non-volatile memory 1804. Such algorithm may include a sequence of more detailed operations, discussed hereinabove and in connection with the figures below.

The apparatus 1800 may include a processor module 1810 having at least one processor. The processor 1810 may be in operative communication with the modules 1802 via a bus 1812 or equivalent communication coupling. The processor 1810 may effect initiation and scheduling of the processes or functions performed by electrical components 1802, and may at times hold a copy of portal device components (e.g., program instructions for performing portal operations) in an associated volatile on-chip memory 1816.

In related aspects, the apparatus 1800 may include a network interface port 1815. A port may be, or may include, for example, an Ethernet port or serial port (e.g., a Universal Serial Bus (USB) port). In further related aspects, the apparatus 1800 may optionally include a module for storing information, such as, for example, a memory device 1804 or volatile memory 1816. The computer readable medium or the memory module 1816 may be operatively coupled to the other components of the apparatus 1800 via the bus 1812 or the like. The memory module 1804 may be adapted to store computer readable instructions and data for execution by the processor 1810 of the operations of the modules 1802, and subcomponents thereof, or the method 1900 and one or more of the additional operations 2000 disclosed herein. The memory module 1816 may retain instructions for executing functions associated with the modules 1802. The modules 1802-1806 can exist within the memory 1816 and/or in other components such as the volatile memory 1816.

Figure 18B:
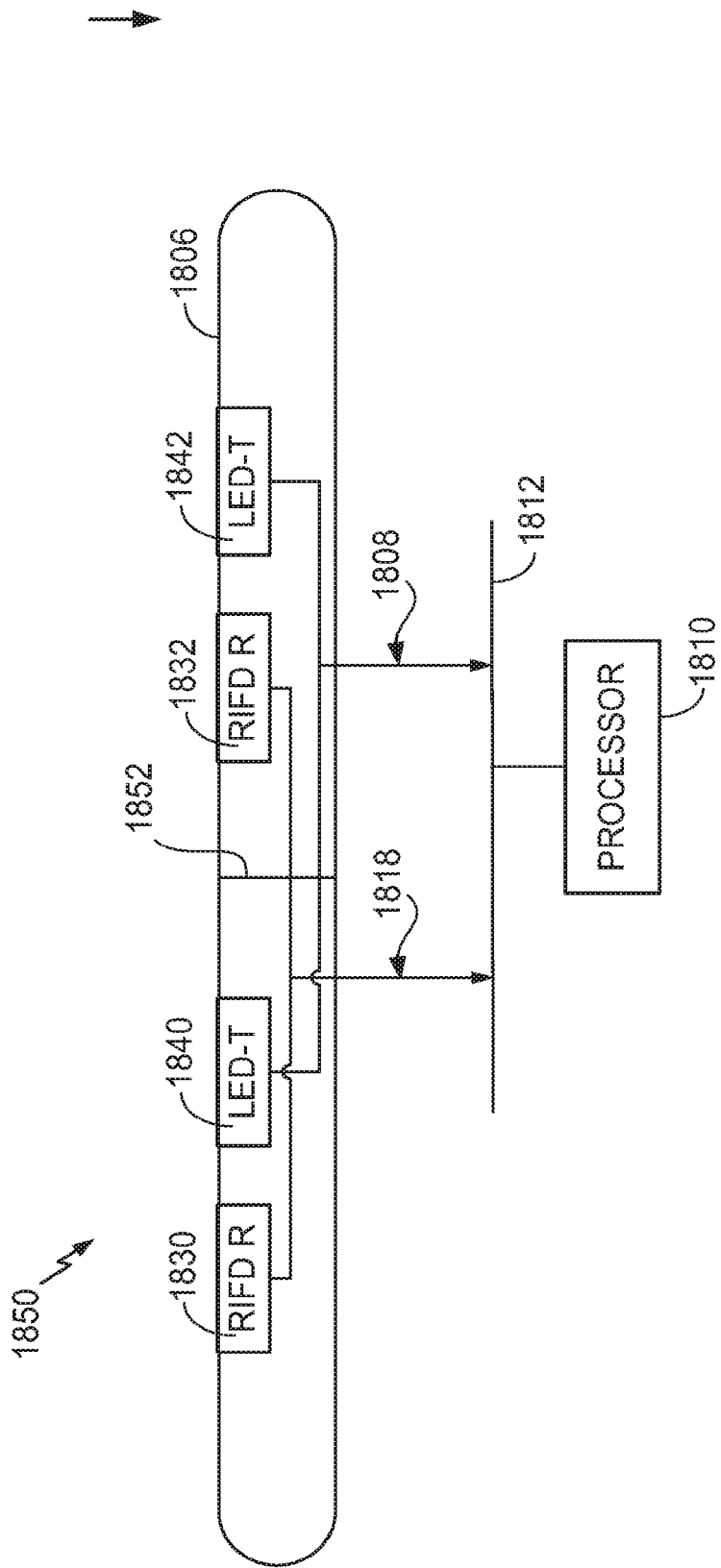

The apparatus 1800 may include a sensor array 1818 and light array 1808, aspects of which have been described in more detail herein above. The apparatus 1800 may include a zoned pad 1806 for placement of a character tag 1825 to which a toy 1822 may be attached, as previously described. Referring to FIG. 18B, the zoned pad 1806 and associated components including the sensor array 1818 and light array 1808 are further illustrated. The sensor pad 1806 may comprise a generally flat translucent upper surface divided into two or more zones by an internal opaque barrier 1852. An RFID sensor (or other sensor node) and color-controllable light source may be mounted in each zone. In the illustrated example, a sensor array 1818 includes an RFID receiver 1830 in the right zone of the pad 1806 and a second RFID receiver 1832 in the left zone. Both RFID receivers are communicatively coupled via a wired or wireless coupling to the processor 1810 of the portal device and operate independently to sense placement of a character tag only in their own zone.

A light array 1808 includes an LED red-blue-yellow triplet 1840 in the right zone of the pad 1806 and a second LED triplet 1842 in the left zone. Both LED triplets are communicatively coupled via a wired or wireless coupling to the processor 1810 of the portal device and can be controlled independently by the processor to illuminate only the zone in which they are placed with a desired color of light. The pad 1806 may include any plural number of zones each similarly equipped with an independently controllable node of a sensor array and a light array. However, for use with childrens' toys as depicted herein, a number of zones in the range of 2 to 8 is believed useful, which each zone in the range of about one square inch to four square inches in area.

In view the foregoing, and by way of additional example, FIGS. 19-20 show aspects of a method 1900 or methods performed by portal device executing program instructions. Referring to FIG. 19, a portal-implemented method for cooperating with a game machine to enhance game play may include, at 1910, receiving an activation signal from a game computer executing the video game process, wherein the activation signal is configured for requesting activation of the at least one sensor. Activation may include, for example, initializing a session of portal operation in connection with a game process. Optionally, an activation sequence confirms functionality of the portal-computer interface as needed to complete an interactive session, including but not limited to confirming that communication between the portal device and the game machine is operating correctly and that the portal device's other electronic components have not provided any indication of malfunction.

The method 1900 may include, at 1920, generating a portal output signal based on the identity of the one or more character tags placed on the pad and on which of the distinct zones the one or more character tags are placed. This may include, for example, reading an identification code using a RFID receiver that is configured to only read character tags that are placed in its particular zone and generating a message for sending the identification code to the portal device's output port according to a designated API and communications protocol. An RFID receiver may be constructed to have a specified range for reading a particular type of RFID transmitter (e.g., a near-field, UHF transmitter) that is assembled inside the character tags. In an alternative, a camera or cameras may be positioned in the base of the portal device to read one or more optical codes printed on the underside of the character tags in relation to zone boundaries. The portal output device may send detected identification information as detected or may process the detected information to a different format suitable for the cooperating game process. However formatted or processed, the information to be provided to the game process should include, or be derived from, identifiers for sensed character tags and the zones on which they are placed and removed, coupled to an implicit or explicit chronology for the placement and removal of tags. To the extent that the game process does not control coloration of the zones, the output signal may also include an indicator of current zone coloring.

The method 1900 may include, at 1930, sending the portal output signal to the game computer. For example, a message prepared at block 1920 may be provided to a transport layer for a selected transmission port (e.g., a serial port or Ethernet port), which transmits the output signal according to a selected protocol.

The method 1900 may include any one or more of additional operations 2000, shown in FIG. 20, in any operable order. Each of these additional operations is not necessarily performed in every embodiment of the method, and the presence of any one of the operations 2000 does not necessarily require that any other of these additional operations also be performed.

Referring to FIG. 20 showing certain additional operations 2000, the method 1900 may further include, at 2010, changing a color of any one of the distinct zones based on information from the computer executing the video game process. For example, the game process may instruct the portal device to change a particular zone to a particular color. Control of color may be accomplished using a triplet or other combination of differently colored LEDs to illuminate each zone.

The method 1900 may further include, at 2020, changing a color of any one of the distinct zones based on which of one or more character tags are placed there. For example, the portal device may associate a color with a particular character or characters, determine which, if any, zone in which the corresponding character tag(s) is/are located, and set the illumination color for that zone to the predetermined color. The portal device may transmit an indication of the color to the game process and which zones are illuminated in which colors.

The method 1900 may further include, at 2030, changing a color of any one of the distinct zones based on information from the computer executing the video game process and based on which of one or more character tags are placed there. For example, the game process may associate a color with a particular character or characters and send an indication of the characters and their associated colors to the portal device. The portal device may determine which, if any, zone in which the corresponding character tag(s) is/are located and set the illumination color for that zone to the color indicated by the game process by controlling the outputs of LED devices.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various display aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method, comprising:
communicating, by at least one processor executing a video game process that manipulates an avatar in response to user input, control data with a placement portal that is communicatively coupled to the game computer, wherein the control data defines a selected one of distinct zone colors for indication by the placement portal in each of different zones;
receiving, by the at least one processor, portal data from the placement portal, wherein the portal data identifies a character tag and a zone of the different zones where the character tag is located;
identifying, by the at least one processor, an identity of the character tag and a current color defined by the control data for the zone where the character tag is located, based on the portal data; and
changing, by the at least one processor, a game state of the video game process, based on an identity of the character tag the current color for the zone where the character tag is located.

2. The method of claim 1, wherein the changing further comprises activating a color-indicated function in the video game process that matches the current color for the zone where the character tag is located.

3. The method of claim 2, wherein the color-indicated function comprises enabling access by the avatar to one of multiple rifts matching the one of the controllable colors.

4. The method of claim 2, wherein the color-indicated function comprises setting a key color for unlocking a color-pattern lock by the avatar.

5. The method of claim 4, wherein setting the key color comprises selecting a color based on a mix of different primary colors assigned to two of the zones each occupied by a different character tag.

6. The method of claim 2, wherein the color-indicated function comprises setting a variable trait of the avatar based on the one of the controllable colors, wherein the variable trait is selected from: a mode of play or scale.

7. The method of claim 1, wherein the communicating the control data comprises sending data to the placement portal that defines the selected one of distinct zone colors for indication by the placement portal in each of different zones thereof.

8. An apparatus for playing a computer game, comprising:
a processor, a memory coupled to the processor, and port for coupling a placement portal to the processor, wherein the memory holds instructions that when executed by the processor, cause the apparatus to perform:
executing a video game process that manipulates an avatar in response to user input;
communicating control data with a placement portal that is communicatively coupled to the game computer, wherein the control data defines a selected one of distinct zone colors for indication by the placement portal in each of different zones;
receiving portal data from the placement portal, wherein the portal data identifies a character tag and a zone of the different zones where the character tag is located;
identifying an identity of the character tag and a current color defined by the control data for the zone where the character tag is located, based on the portal data; and changing a game state of the video game process, based on an identity of the character tag and the current color for the zone where the character tag is located.

9. The apparatus of claim 8, wherein the memory holds further instructions for the changing at least in part by activating a color-indicated function in the video game process that matches the current color for the zone where the character tag is located.

10. The apparatus of claim 9, wherein the memory holds further instructions for the color-indicated function comprising enabling access by the avatar to one of multiple rifts matching the one of the controllable colors.

11. The apparatus of claim 9, wherein the memory holds further instructions for the color-indicated function comprising setting a key color for unlocking a color-pattern lock by the avatar.

12. The apparatus of claim 11, wherein the memory holds further instructions for setting the key color at least in part by selecting a color based on a mix of different primary colors assigned to two of the zones each occupied by a different character tag.

13. The apparatus of claim 9, wherein the memory holds further instructions for the color-indicated function comprising setting a variable trait of the avatar based on the one of the controllable colors, wherein the variable trait is selected from: a mode of play or scale.

14. The apparatus of claim 8, wherein the memory holds further instructions for the communicating the control signal at least in part by sending data to the placement portal that defines the selected one of distinct zone colors for indication by the placement portal in each of different zones thereof.

15. The apparatus of claim 8, further comprising the placement portal communicatively coupled to the processor, comprising:
a base supporting an electronic circuit in an assembly;
a pad coupled to the base, the pad configured for placement and removal of the character tags; wherein the pad is divided into the different zones;
an array of light-emitting devices fixed in relation to the pad, and configured to independently illuminate each of the different zones with any one of the zone colors defined by the control data; and
multiple sensors coupled to the electronic circuit and configured for sensing an identity of one or more character tags placed on the pad and for sensing which of the different zones the character tag is placed.

16. An apparatus comprising:
a processor, a memory coupled to the processor, and a port for coupling the apparatus to a computer executing a video game process;
a base supporting the processor, memory and port in an assembly;
a pad divided into distinct zones coupled to the base, the pad configured for placement and removal of character tags on the distinct zones, wherein each of the zones is configured to independently indicate any one of zone colors defined by control data from the port for coupling to the computer executing the video game process; and
at least one sensor coupled to the processor and configured for sensing an identity of one or more character tags placed on the pad and for identifying each of the distinct zones on which the one or more character tags are placed.

17. The apparatus of claim 16, wherein the memory holds instructions that when executed by the processor, cause the apparatus to perform:
receiving control data from the computer executing the video game process defining a selected one of zone colors for indication in each of the distinct zones;
generating a data output based on the identity of the one or more character tags placed on the pad and on which of the distinct zones the one or more character tags are placed; and
sending the data output to the game computer.

18. The apparatus of claim 17, wherein the memory holds further instructions for illuminating each of the distinct zones with a corresponding one of the zone colors defined by the control data.

19. The apparatus of claim 17, wherein the memory holds further instructions for changing a color of any one of the distinct zones based on at least one of information from the computer executing the video game process or which of one or more character tags are placed there.

20. The apparatus of claim 16, wherein the at least one sensor comprises an array of RFID receivers, each of the receivers mounted in proximity to a different one of the distinct zones.

21. The apparatus of claim 16, wherein each of the zones is configured to independently indicate the any one of the zone colors using an array of light emitting devices.

22. The apparatus of claim 21, wherein the array of light emitting devices comprises sets of two or more light-emitting devices (LEDs) each configured for emitting a different color of light, each of the sets mounted in proximity to a different one of the distinct zones.

23. The apparatus of claim 16, further comprising an attachment plate adjacent to the pad, configured for attachment of toy interlocking plastic bricks.

* * * * *